United States Patent
Kikuchi et al.

(10) Patent No.: US 7,224,665 B2
(45) Date of Patent: May 29, 2007

(54) OPTICAL RECORDING MEDIUM ITS MANUFACTURING METHOD AND INJECTION MOLDING APPARATUS

(75) Inventors: Minoru Kikuchi, Miyagi (JP); Akio Koshita, Miyagi (JP); Jun Nakano, Tokyo (JP)

(73) Assignee: Sony Corporation, Tokyo (JP)

(*) Notice: Subject to any disclaimer, the term of this patent is extended or adjusted under 35 U.S.C. 154(b) by 58 days.

(21) Appl. No.: 10/182,173

(22) PCT Filed: Nov. 28, 2001

(86) PCT No.: PCT/JP01/10376

§ 371 (c)(1),
(2), (4) Date: Mar. 13, 2003

(87) PCT Pub. No.: WO02/45082

PCT Pub. Date: Jun. 6, 2002

(65) Prior Publication Data
US 2003/0161255 A1    Aug. 28, 2003

(30) Foreign Application Priority Data
Nov. 30, 2000    (JP)    ............... 2000-366052

(51) Int. Cl.
G11B 3/70    (2006.01)
(52) U.S. Cl. .................................... 369/280
(58) Field of Classification Search ............... 369/280, 369/281, 282, 286, 275.2; 720/718, 719, 720/723, 724; 428/64.9, 64.1, 65.1; 156/235; 360/290.1
See application file for complete search history.

(56) References Cited

U.S. PATENT DOCUMENTS 5,021,276 A * 6/1991 Kamezaki et al. ......... 428/64.9
5,859,834 A * 1/1999 Takahashi et al. ........... 720/723
5,999,513 A * 12/1999 Arakawa et al. ............. 369/282
6,154,437 A * 11/2000 Utsunomiya et al. ..... 369/275.2
6,375,784 B1 * 4/2002 Ohsawa et al. ............. 156/235
6,404,730 B2 * 6/2002 Yeo et al. .................... 369/281
6,625,107 B2 * 9/2003 Kawano .................. 369/275.5

FOREIGN PATENT DOCUMENTS

| JP | 60-261042 | 12/1985 |
| JP | 1-135606 | 5/1989 |
| JP | 05-307769 | 11/1993 |

(Continued)

*Primary Examiner*—Tianjie Chen
(74) *Attorney, Agent, or Firm*—Sonnenschein Nath & Rosenthal LLP

(57) ABSTRACT

In an optical disc in which an information signal is recorded/reproduced by irradiating a laser beam to a disc substrate 1 in which an information signal portion 1c has been provided on one principal plane from the side where the information signal portion 1c exists, a clamp reference surface 3a is set to the information signal portion 1c side of a replica substrate 1a constructing the optical disc. The clamp reference surface 3a is set to a flat surface and a thickness of the replica substrate 1a in a clamping area 3 is set to be larger than that of the convex-shaped replica substrate 1a in an information recording area 4. The replica substrate 1a in which a periphery of a center hole 1b is thicker than the information recording area 4 is used.

11 Claims, 13 Drawing Sheets

FOREIGN PATENT DOCUMENTS

| | | |
|---|---|---|
| JP | 06-251426 | 9/1994 |
| JP | 7171902 | 7/1995 |
| JP | 11-031337 | 2/1999 |
| JP | 11-156897 | 6/1999 |
| JP | 11-339330 | 12/1999 |
| JP | 2000-298879 | 10/2000 |
| JP | 2000298879 A * | 10/2000 |
| JP | 2000-311382 | 11/2000 |
| JP | 2000-322765 | 11/2000 |
| JP | 2000-322768 | 11/2000 |
| JP | 2000-322781 | 11/2000 |

* cited by examiner

OPTICAL RECORDING MEDIUM ITS MANUFACTURING METHOD AND INJECTION MOLDING APPARATUS

BACKGROUND OF THE INVENTION

The invention relates to an optical recording medium, its manufacturing method, and an injection molding apparatus. More particularly, the invention is suitable when it is applied to an optical recording medium onto/from which an information signal is recorded and reproduced by irradiating light from the side of a substrate where an information signal portion has been formed.

BACKGROUND ART

In recent years, in the field of information recording, various studies and development regarding an optical information recording system have been being made. According to the optical information recording system, it has an advantage such that the recording and reproduction can be performed in a contactless manner and a recording density which is one or more digits higher than that of a magnetic recording system can be accomplished. The optical information recording system also has an advantage such that it can cope with various memory formats such as read only type, write once type, rewritable type, and the like. Therefore, as a system which enables a cheap file of a large capacity to be realized, its application to fields of a wide range from the industrial use to the consumer use is considered.

Among those formats, particularly, as optical discs corresponding to the memory format of the read only type, a digital audio disc (DAD), an optical video disc, and the like have widely been spread.

A construction of the optical disc such as a digital audio disc or the like as mentioned above will be described hereinbelow. That is, in the optical disc, a reflective layer made of a thin metal film such as an aluminum (Al) film or the like and a protective film to protect the reflective layer from moisture ($H_2O$) or oxygen ($O_2$) in the atmosphere are sequentially formed on one principal plane of an optical disc substrate made of a transparent substrate on which concave/convex patterns such as pits, grooves, and the like showing an information signal have been formed. In such an optical disc, in case of reproducing the information signal, first, reproducing light such as a laser beam or the like is irradiated to the concave/convex patterns from the disc substrate side. The information signal is detected by a difference of reflectance between incident light and return light of the reproducing light.

Ordinarily, the disc substrate constructing such an optical disc is made of a synthetic resin material and molded by using a die apparatus for injection molding. A disc substrate molding injection molding apparatus for molding the disc substrate will now be described with reference to the drawings.

That is, as shown in FIG. 16, the injection molding apparatus for molding the disc substrate is constructed by having a die 103 in which a fixed die 101 and a movable die 102 which are fixed to a stationary platen 100 are arranged so as to face each other. When the fixed die 101 and movable die 102 are set so as to face each other, a cavity 104 for molding is formed between the fixed die 101 and the movable die 102. The cavity 104 for molding has a shape corresponding to a disc substrate 201 which is molded as shown in FIG. 17.

A through-hole is formed at a center position of the fixed die 101 in the injection molding apparatus shown in FIG. 16. A stamper holder supporting member 106 having almost a ring shape pierces the through-hole. A sprue bush 107 is provided so as to be inserted into the stamper holder supporting member 106.

The sprue bush 107 has the ring shape and a resin injection hole 108 is formed along a center axis in the ring shape. The resin injection hole 108 is constructed so that a synthetic resin material such as a fused polycarbonate resin or the like which is supplied from an injecting apparatus (not shown) can flow into the cavity 104 for molding. That is, a front edge side of the sprue bush 107 is constructed so as to face the inside of the cavity 104 for molding. A diameter of a front edge side of the stamper holder supporting member 106 which faces the cavity 104 for molding is reduced in a stairway manner.

A stamper 109 is attached to a surface portion of the fixed die 101 constructing the cavity 104 for molding, that is, a surface portion of the fixed die 101 which faces the movable die 102. The stamper 109 is formed in a disc shape having a center hole 109a in a center portion. The stamper 109 is used to form the concave/convex patterns corresponding to the information signal or pregrooves constructing recording tracks onto the disc substrate. The stamper 109 is constructed so that it can be supported at an inner peripheral edge of the center hole 109a by a stamper inner peripheral holder 110 in a ring shape and can be supported at a disc-shaped outer peripheral edge by a stamper outer peripheral holder 111 in a ring shape, so that the stamper 109 is attached to the fixed die 101. That is, the stamper inner peripheral holder 110 which supports the peripheral edge of the center hole 109a serving as an inner peripheral edge side of the stamper 109 is fitted to the outer peripheral side of the stamper holder supporting member 106, located on the front edge side of the sprue bush 107, and attached to the fixed die 101. A claw portion 110a for supporting the stamper is provided in an outer peripheral portion on the molding cavity 104 side of the stamper inner peripheral holder 110. The claw portion 110a for supporting the stamper is used to support the peripheral edge of the center hole 109a of the stamper 109.

On the other hand, a through-hole is formed at a center position of the movable die 102. A sleeve 112 in a cylindrical shape penetrates the through-hole of the movable die 102. The sleeve 112 is constructed so as to be movable forward and backward into/from the molding cavity 104 and is supported by the movable die. A front edge surface of the sleeve 112 which faces the molding cavity 104 is slightly inserted into the movable die 102. A columnar punch 113 is fitted into the cylinder of the sleeve 112. A front edge surface of the punch 113 which faces the molding cavity 104 is slightly projected from the front edge surface of the sleeve 112.

A method of forming the disc substrate 201 shown in FIG. 17 by using the disc substrate molding die apparatus constructed as mentioned above will now be described.

That is, first, the molding cavity 104 is formed by confronting the movable die 102 with the fixed die 101. A fused synthetic resin material such as PC or the like is injected and filled into the molding cavity 104 from the foregoing injecting apparatus (not shown) via the resin injection hole 108 of the sprue bush 107. At this time, in the molding cavity 104, the synthetic resin material in the fused state flows from the center portion toward the outer peripheral side. By moving the movable die 102 toward the fixed die 101 side, closing to compress the synthetic resin material filled in the molding cavity 104 is performed. After that, the synthetic resin material is solidified by cooling it. Thus, the disc substrate 201 corresponding to the molding cavity 104 is formed.

A center hole 202 in the disc substrate 201 is formed by projecting the punch 113 toward the fixed die 101 side. After that, opening to remove the movable die 102 so as to be away from the fixed die 101 is executed while the sleeve 112 is projected toward the fixed die 101 side. Thus, the molded disc substrate 201 is away from the die 103. By removing the disc substrate 201 from the fixed die, the molding of the disc substrate 201 shown in FIG. 17 is completed.

The center hole 202 formed at the center by the punch 113 and a stamper pressing groove 203 formed by the claw portion 110a for supporting the stamper are formed in the disc substrate 201 molded as mentioned above. Concave and convex portions serving as a mirror image corresponding to the stamper 109 are transferred onto one principal plane of the disc substrate 201, so that an information recording area 204a is formed. A recording surface 204 including the information recording area 204a and a mirror surface 205 on the side opposite to the recording surface 204 are formed. A clamp reference surface 206a serving as a surface which is clamped when the disc is set to a spindle of a recording and reproducing apparatus (not shown) is formed in an inner peripheral portion of the mirror surface 205. The clamp reference surface 206a is formed by a mirror surface portion of the movable die 102 upon injection molding.

The disc substrate 201 is manufactured as mentioned above. An optical disc such as rewritable type optical disc, read only type optical disc, or the like is manufactured by using the disc substrate 201.

In the optical disc manufactured by using the disc substrate 201 as mentioned above, a further high recording density has been required in recent years. In order to meet such a requirement for the high recording density, therefore, a technique for reducing a spot diameter of the reproducing light by increasing a numerical aperture (NA) of an objective lens which is used when the reproducing light of an optical pickup is irradiated has been proposed. Specifically speaking, although an NA of an objective lens which is used upon reproduction of a conventional digital audio disc is equal to 0.45, an NA of an objective lens which is used upon reproduction of an optical video disc such as a DVD (Digital Versatile Disc) or the like having a recording capacity which is 6 to 8 times as large as that of the digital audio disc is equal to about 0.60. By increasing the numerical aperture NA as mentioned above, miniaturization of the spot diameter can be realized.

By accomplishing the large NA of the objective lens as mentioned above, it is necessary to thin the substrate in the optical recording medium in order to transmit the irradiated reproducing light. This is because a permission amount of an angle (tilt angle) at which a direction perpendicular to the disc surface is deviated from an optical axis of the optical pickup is small. This is also because the tilt angle is easily influenced by aberration or birefringence due to a thickness of the disc substrate. Therefore, the tilt angle is set to be as small as possible by thinning the disc substrate. For example, in the foregoing digital audio disc, the substrate thickness is set to about 1.2 mm. In the optical video disc such as a DVD or the like having the recording capacity which is 6 to 8 times as large as that of the digital audio disc, the substrate thickness is set to about 0.6 mm.

A further thin substrate is necessary in consideration of a requirement of realization of a further high recording density in the future. Therefore, there has been proposed an optical recording medium constructed in a manner such that an information signal portion is formed by forming concave/convex portions onto one principal plane of the substrate, a reflective film and a light transmitting layer as a thin film for transmitting the light are sequentially laminated onto the information signal portion, and the reproducing light is irradiated from the light transmitting layer side, thereby reproducing the information signal. In the optical recording medium constructed in a manner such that the information signal is reproduced by irradiating the reproducing light from the light transmitting layer side as mentioned above, the large NA of the objective lens can be accomplished by thinning the light transmitting layer.

An example of an optical recording medium constructed so as to reproduce the information signal by irradiating the reproducing light from the light transmitting layer side as mentioned above has been disclosed in JP-A-10-283683 (literature 1). In the literature 1, a method of adhering a light transmitting sheet onto the disc substrate by using an ultraviolet hardening resin is used to form the light transmitting layer.

According to the literature 1, first, the ultraviolet hardening resin is supplied onto one principal plane of the substrate. Subsequently, the light transmitting sheet constructed so that the laser beam can be transmitted is put onto the ultraviolet hardening resin. After that, the substrate and the light transmitting sheet which were laminated via the ultraviolet hardening resin are rotated in an in-plane direction, thereby allowing the ultraviolet hardening resin to flow into a gap between the substrate and the light transmitting sheet. After the gap is filled with the ultraviolet hardening resin, ultraviolet rays are irradiated to the resin, thereby hardening it. Thus, the substrate and the light transmitting sheet are adhered. Consequently, the light transmitting layer comprising the hardened ultraviolet hardening resin and the light transmitting sheet is formed.

However, in the optical disc as mentioned above, the laser beam for recording and reproducing is irradiated to the disc substrate from the side where the information recording area exists. Therefore, in such an optical disc, it is necessary that the clamp reference surface which is used when the disc is mounted to a spindle of a recording and reproducing apparatus is formed on the side opposite to the side of the conventional optical disc to which the laser beam is irradiated from the substrate side. That is, it is necessary that the clamp reference surface is formed on the side of the recording surface where the information recording area has been formed.

However, as shown in FIG. 17, in the conventional optical disc, a reference surface of a clamping area 206 exists on the surface (mirror surface 205) of a replica substrate 201 on the side opposite to the recording surface 204 side where the concave and convex portions have been formed. Therefore, upon molding of the disc substrate 201 by the injection molding, the clamp reference surface 206a is formed by the mirror surface portion of the movable die 102 shown in FIG. 16. Thus, the clamp reference surface 206a of the disc substrate 201 is flattened at very high precision and has high flatness.

On the other hand, on the side of the recording surface 204 as a surface on the opposite side, the stamper pressing groove 203, burrs which are caused at a boundary of the stamper holder supporting member 106 and stamper inner peripheral holder 110, and the like exist. Therefore, the inner peripheral portion of the recording surface 204 in the disc substrate 201 has low flatness and it is very difficult to use such an area as a clamping area.

Further, the inventors of the present invention performed various experiments with respect to the optical disc in which the clamp reference surface is provided on the recording surface side as mentioned above. Thus, it was confirmed that when the optical disc is chucked and rotated at a predetermined speed, its surface oscillation (drift) is very large.

In association with the realization of the large NA of the objective lens of the optical system, such a drift causes a defective recording or a defective reproduction in an optical recording medium in which a wavelength of the laser beam which is used for recording and/or reproduction is shortened. Therefore, it becomes a large problem when an optical recording medium whose recording density has been improved is put into practical use.

Therefore, the inventors of the present invention examined with zeal, so that they found an optical disc in which an information signal portion constructed so that an information signal can be recorded and/or reproduced is provided on one principal plane of a disc substrate, a light transmitting layer constructed so that a laser beam which is used for recording and/or reproducing the information signal can be transmitted is provided on the side where the information signal portion exists, and a clamp reference surface is set on the surface of the light transmitting layer. Such an optical disc is shown in FIG. 18.

As shown in FIG. 18, according to the optical disc, a center hole 201b is formed in a center portion of the replica substrate 201a, and an information signal portion 201c is provided on one principal plane on which concave and convex portions have been formed. A light transmitting layer 202 is formed on the disc substrate 201. The light transmitting layer 202 is constructed by adhering a light transmitting sheet 202a via an adhesive layer 202b. A through-hole 202c is formed in a center portion of the light transmitting layer 202. A diameter of the through-hole 202c is equal to or larger than that of the center hole 201b and equal to about 15 mm. The clamping area 206 is set in a ring shape around the through-hole 202c. The clamp reference surface 206a is set to the principal plane of the light transmitting layer 202 in the clamping area 206 on the side of the light transmitting sheet 202a.

The optical disc constructed as mentioned above in a manner such that the clamp reference surface 206a is set to the portion on one principal plane of the light transmitting layer 202 has an advantage such that the surface oscillation can be reduced.

However, if the optical disc having the light transmitting layer formed as mentioned above is set to the recording and reproducing apparatus, since a working distance serving as a gap between the objective lens of the large NA and the light transmitting layer is very narrow to be about 300 µm, if the objective lens and the light transmitting layer collide, the light transmitting layer is scratched.

Therefore, the inventors of the present invention further found a method of performing a hard coating process to the surface of the light transmitting layer in order to prevent scratches. Since a hard coating film formed by the hard coating process is made of an ultraviolet hardening resin and contains an additive such as silicon oil or the like as a composition, high surface lubricating performance can be held. Since the high surface lubricating performance is held, the occurrence of the scratch onto the light transmitting layer due to the contact between the objective lens of the large NA and the hard coating film mentioned above can be prevented.

The following two methods are considered as methods of forming such a hard coating film. That is, there are a method whereby after the light transmitting layer was formed onto the disc substrate, the hard coating film is formed by a spin coating method and a method whereby a light transmitting sheet which has preliminarily been made of a resin for a hard coating film by a roll coating method is adhered onto the disc substrate. Between those two methods, the latter method is more advantageous from a viewpoint of a use ratio of the resin for hard coating film.

With respect to the clamping area of the optical disc in which the clamp reference surface has been set to the portion of one principal plane of the light transmitting layer and which corresponds to the objective lens with the large NA, although one of the surfaces of such a clamping area serves as a substrate material, the other surface (the clamp reference surface) serves as one principal plane of the light transmitting layer. As a method of clamping the optical disc as mentioned above, what is called a magnet clamping method of clamping the optical disc by a magnet and a metal plate made of a magnetic material is a general method.

However, the present inventors clamped the optical disc by such a clamping method and found that, particularly, the optical disc is raced in the recording and reproducing apparatus for consumer use. Especially, the present inventors found that the race is remarkable in the optical disc in which the hard coating process has been performed to one principal plane of the light transmitting layer.

The present inventors also found that in the case where the light transmitting layer has been adhered onto the disc substrate, if a foreign matter is come into contact with a portion near the through-hole of the light transmitting layer (a boundary with the adhesive layer, or the like) or a force is applied to the periphery of the through-hole of the light transmitting layer by a shock, there is a possibility such that the light transmitting layer is peeled off.

It is, therefore, an object of the invention to provide an optical recording medium in which even in a case where a light transmitting layer is formed, a peel-off of the light transmitting layer can be prevented, and even in a case where the medium is put to a spindle of a recording and reproducing apparatus and/or a reproducing apparatus and rotated, flatness of a clamp reference surface is improved, a surface oscillation is suppressed, friction of the clamp reference surface is increased, a race can be prevented, and the recording and/or reproduction of an information signal can be executed with high reliability. It is also an object of the invention to provide an optical recording medium manufacturing method which can manufacture such an optical recording medium and an injection molding apparatus which can manufacture a substrate which is used for such an optical recording medium.

SUMMARY OF THE INVENTION

To accomplish the above object, according to the invention of Claim 1, there is provided an optical recording medium constructed in a manner such that an information signal portion is provided on one principal plane of a substrate, and by irradiating a laser beam to the information signal portion of the substrate from a side where the information signal portion exists, an information signal can be recorded and/or reproduced to/from the information signal portion, wherein a clamp reference surface exists on the principal plane of the substrate where the information signal portion has been provided, at least the clamp reference surface is constructed by a flat surface, and a thickness of the substrate in a clamping area which is specified by the clamp reference surface is larger than that of the substrate in a forming area of at least the information signal portion.

According to the invention of Claim 1, typically, in order to form an optical disc which can realize a large NA, a light transmitting layer which can transmit at least the laser beam is provided on the principal plane of the substrate where the information signal portion has been provided. In the invention of Claim 1, typically, a film thickness of the light transmitting layer lies within a range from 90 μm or larger to 110 μm or less.

In the invention of Claim 1, preferably, in order to prevent a scratch of the light transmitting layer due to the collision between an objective lens of optical pickup which is used for recording and/or reproduction and the light transmitting layer, an exposed surface of the light transmitting layer, that is, a surface of the optical pickup which faces the objective lens has lubricating performance. Specifically speaking, in a case where the surface of the light transmitting layer to which the laser beam is irradiated has lubricating performance and the light transmitting layer is constructed so as to have at least a light transmitting sheet, an exposed surface of the light transmitting sheet on the side opposite to the side where the substrate has been provided has the lubricating performance.

In the invention of Claim 1, typically, a total thickness of the thickness of the substrate in an area where the light transmitting layer has been formed and a film thickness of the light transmitting layer is almost equal to the thickness of the substrate in the clamping area.

In the invention of Claim 1, typically, the light transmitting layer is constructed by a light transmitting sheet which can transmit at least the laser beam and an adhesive layer which can transmit at least the laser beam, and the light transmitting sheet is provided via the adhesive layer onto the principal plane of the substrate where the information signal portion has been provided.

In the invention of Claim 1, typically, grooves are formed in an area on the principal plane of the substrate, except for the forming area of the light transmitting layer, and in an area other than the clamp reference surface. Usually, those grooves are formed by a stamper supporting claw portion which is used to support a stamper in the injection molding apparatus.

In the invention of Claim 1 preferably, the light transmitting layer comprises: a light transmitting sheet; an adhesive layer for adhering the light transmitting sheet onto the principal plane of the substrate; and a protective layer which is provided on a surface on the side opposite to the side of the light transmitting sheet where the adhesive layer has been provided and is used to protect the light transmitting sheet, wherein a total thickness of the thickness of the substrate in the area where the light transmitting layer has been provided and a film thickness of the light transmitting layer is almost equal to the thickness of the substrate in the clamping area. In the invention of Claim 1, typically, the protective layer has lubricating performance. In the invention of Claim 1, preferably, the light transmitting sheet is made of a thermoplastic resin which can transmit at least the laser beam and the protective layer is made of an ultraviolet hardening resin. In the invention of Claim 1, preferably, the light transmitting sheet is made of the same kind of material as that of the substrate. The adhesive layer is made of a pressure sensitive adhesive agent or an ultraviolet hardening resin.

In the invention of Claim 1, typically, the light transmitting layer has a plane ring shape in which a second opening is formed in the center portion, and a diameter of the second opening is larger than an outer peripheral diameter of the clamp reference surface of the disc substrate.

To accomplish the above object, according to the invention of, there is provided a manufacturing method of an optical recording medium in which a clamp reference surface exists on one principal plane of a substrate, comprising a step of forming an information signal portion onto the principal plane of the substrate where the clamp reference surface exists, wherein the clamp reference surface is formed in a flat shape and a thickness of the substrate in a clamping area which is specified by the clamp reference surface is set to be larger than that of the substrate in the forming area of the information signal portion.

In the invention of, typically, a light transmitting layer which can transmit at least a laser beam is formed on the principal plane of the substrate where the information signal portion has been provided.

In the invention of, typically, a total thickness of the thickness of the substrate in an area where the light transmitting layer has been provided and a film thickness of the light transmitting layer is almost equal to the thickness of the substrate in the clamping area.

In the invention of, typically, the light transmitting layer is constructed by a light transmitting sheet which can transmit at least the laser beam and an adhesive agent which can transmit at least the laser beam, and the light transmitting sheet is adhered via the adhesive agent onto the principal plane of the substrate where the information signal portion has been provided.

In the invention of, typically, a groove is formed in an area other than the forming area of the light transmitting layer on the principal plane of the substrate and an area other than the clamp reference surface. In the injection molding apparatus, usually, this groove is formed by a stamper supporting claw portion which is used when the stamper is supported.

In the invention of, typically, the light transmitting layer comprises: a light transmitting sheet; an adhesive layer for adhering the light transmitting sheet onto the principal plane of the substrate; and a protective layer which is provided on the surface of the light transmitting sheet on the side opposite to the side where the adhesive layer has been formed and is used to protect the light transmitting sheet. In the invention of Claim 22, preferably, the protective layer has lubricating performance. In the invention of, typically, the light transmitting sheet is made of a thermoplastic resin which can transmit at least a laser beam. In the invention of, preferably, the light transmitting sheet is made of the same kind of material as that of the substrate. Typically, the adhesive layer is made of a pressure sensitive adhesive agent or an ultraviolet hardening resin. Although the protective layer is typically made of an ultraviolet hardening resin, it can be also made of a carbon system material such as diamond-like carbon (DLC) or the like.

In the invention of, typically, the substrate is a disc substrate having a plane ring shape in which a first opening is formed in a center portion. The clamp reference surface is set in a plane ring shape.

In the invention of, typically, the light transmitting layer has a plane ring shape in which a second opening is formed in a center portion. A diameter of the second opening is larger than an outer peripheral diameter of the clamp reference surface on the disc substrate.

In the inventions of Claim 1, typically, the thickness of the substrate in the clamping area lies within a range from 1.1 mm or more to 1.3 mm or less.

In the inventions of Claim 1, typically, the substrate is a disc substrate having a plane ring shape in which a first opening is formed in a center portion. In the inventions of Claim 1, typically, the clamp reference surface is set in a plane ring shape, a diameter of the innermost rim of the clamp reference surface lies within a range from 22 mm or more to 24 mm or less, and a diameter of the outermost rim of the clamp reference surface lies within a range from 32 mm or more to 34 mm or less.

To accomplish the above object, according to the invention, there is provided an injection molding apparatus constructed so that a substrate in which a clamp reference surface exists on the side of a recording surface having a forming area of an information signal portion can be molded, comprising:

a first die for molding a surface portion on the recording surface side; and a second die for molding a surface portion of the substrate on the side opposite to the recording surface side, wherein when the first and second dies are arranged so as to face each other, an interval between a surface of the first die which is come into contact with the substrate and a surface of the second die which is come into contact with the substrate in a portion where a clamping area which is specified by the clamp reference surface is located is larger than an interval between a surface of the first die which is come into contact with the substrate and a surface of the second die which is come into contact with the substrate in a portion where the forming area of the information signal portion is located.

In the invention, typically, the apparatus further has stamper supporting means constructed so that a stamper to form the information signal portion on the recording surface side of the substrate can be attached to one principal plane of the first die.

In the invention, typically, the clamping area of the clamp reference surface is formed in a plane ring shape. The stamper is formed in a plane ring shape having a center hole. A diameter of the center hole of the stamper is larger than a diameter of an outermost rim of the clamping area.

In the invention, typically, the stamper supporting means comprises a vacuum adsorbing unit provided for the principal plane of the first die and is constructed in a manner such that the stamper can be adsorbed and fixed onto the principal plane of the first die by the vacuum adsorbing unit.

In the invention, typically, the stamper has a plane ring shape having a center hole and the vacuum adsorbing unit is constructed by a plurality of suction holes arranged and formed along a circular shape on the principal plane of the first die. In the invention, preferably, a diameter of the circular shape is larger than a diameter of an innermost rim of the clamping area and the plurality of suction holes are formed at positions on the outer side of the portion of the first die corresponding to the clamping area.

In the invention, the stamper supporting means has a first claw portion projected from the principal plane of the first die and the first claw portion is provided at the position corresponding to the outside of an outermost rim of the clamping area of the substrate.

In the invention, the stamper is formed in a plane ring shape, the stamper supporting means has a second claw portion for supporting an outer peripheral edge portion of the stamper and is constructed in a manner such that the stamper can be attached to the principal plane of the first die by the second claw portion.

In the invention, typically, an area where concave and convex portions are formed and an area constructed by a flat surface exist on the principal plane of the stamper on the side where it is come into contact with the substrate, and the flat surface is provided inside of the area of the concave and convex portions.

In the invention, typically, in the principal plane of the first die on the side where it is come into contact with the substrate, at least an area corresponding to the clamping area of the clamp reference surface is constructed by a flat surface, and an area corresponding to the information signal portion is constructed by a concave/convex surface.

In the invention, typically, the principal plane of the first die on the side where it is come into contact with the substrate has a ring shape, the area on which concave and convex portions have been formed and the area constructed by the flat surface exist on the principal plane, and the flat surface exists inside of the area where the concave and convex portions have been formed.

In the invention, typically, the clamp area has a plane ring shape, the stamper is formed in a plane ring shape having a center hole, and a diameter of the center hole of the stamper is equal to or less than a diameter of the innermost rim of the clamping area, preferably, is larger than a diameter of the outermost rim of the clamping area.

In the invention, preferably, an area on which concave and convex portions have been formed and an area constructed by a flat surface exist on the principal plane of the stamper on the side where it is come into contact with the substrate, and the flat surface exists inside of the area of the concave and convex portions.

In the invention, preferably, the apparatus further has a step of forming a light transmitting layer constructed so that it can transmit light onto the principal plane where the information signal portion has been formed after the step of forming the information signal portion. The light transmitting layer comprises: an adhesive agent; and a light transmitting sheet adhered via the adhesive agent onto the principal plane where the information signal portion has been formed.

In the invention, typically, the clamp reference plane has a plane ring shape, the stamper is formed in a plane ring shape having a center hole, and a diameter of the center hole of the stamper is larger than that of the outermost rim of the clamping area. In the invention, typically, the stamper supporting means has a first claw portion projected from the principal plane of the first die, and the first claw portion is provided at the position of the substrate corresponding to the outside of the outermost rim of the clamping area. In the invention, the stamper is formed in a plane ring shape, the stamper supporting means has a second claw portion for supporting an outer peripheral edge portion of the stamper and is constructed in a manner such that the stamper can be attached onto the principal plane of the first die by the second claw portion.

In the invention, typically, an area on which concave and convex portions have been formed and an area constructed by a flat surface exist on the principal plane of the stamper on the side where it is come into contact with the substrate, and the flat surface exists inside of the area of the concave and convex portions.

In the invention, typically, the clamping area of the clamp reference plane has a plane ring shape, the stamper is formed in a plane ring shape having a center hole, and a diameter of the center hole of the stamper is equal to or smaller than that of the innermost rim of the clamping area, preferably, it is equal to or smaller than the diameter of the innermost rim. In the invention, preferably, the adsorbing unit is constructed by a plurality of suction holes arranged along a circular shape in the principal plane of the first die. In order to prevent deformation from being caused in the stamper, preferably, a diameter of the circular shape is equal to or smaller than a diameter of the innermost rim of the clamping area.

In the invention, typically, an area on which concave and convex portions have been formed and an area constructed by a flat surface exist on the principal plane of the stamper on the side where it is come into contact with the substrate, and the flat surface exists inside of the area of the concave and convex portions.

In the invention, typically, the clamping area of the clamp reference plane has a plane ring shape, the stamper is formed in a plane ring shape having a center hole, and a diameter of the center hole of the stamper is larger than that of the outermost rim of the clamping area.

In the invention, in order to reduce an amount of surface oscillation which is caused in case of forming a large number of disc substrates by injection molding, typically, the thickness of the stamper is set to 0.5 mm or more.

In the invention, the first die is a fixed die and the second die is a movable die.

Preferably, the invention can be applied to an optical recording medium having a light transmitting layer such as a DVR (Digital Video Recording system) or the like constructed so that information is recorded by using an objective lens whose NA has been improved to about 0.85 by serially combining two lenses, and to the manufacturing of such a medium. The invention can be also applied to an optical recording medium such as what is called DVR-red using a semiconductor laser whose light emitting wavelength is equal to about 650 nm, what is called DVR-blue using a semiconductor laser whose light emitting wavelength is equal to about 400 nm, or the like.

In the invention, typically, the substrate is made of a thermoplastic resin having light transmitting performance, specifically speaking, made of a resin of low water absorbance such as polycarbonate, cycloolefine polymer (for example, ZEONEX (registered trademark)), or the like. Besides them, the substrate can be also made of aluminum (Al), glass, or a resin such as polyolefine, polyimide, polyamide, polyphenylene sulfide, polyethylene terephthalate, or the like.

In the invention, typically, the light transmitting layer is formed in an upper layer of the information signal portion of the substrate. This light transmitting layer is made of a nonmagnetic material which can transmit a laser beam which is irradiated from a GaN system semiconductor laser (a band of a light emitting wavelength of 400 nm; blue light emission), a ZnSe system semiconductor laser (a band of a light emitting wavelength of 500 nm; green), an AlGaInP system semiconductor laser (light emitting wavelength of about 635 to 680 nm; red), or the like. Specifically speaking, the light transmitting layer is made of a thermoplastic resin having light transmitting performance such as polycarbonate or the like.

In the invention, in case of forming the light transmitting layer by the light transmitting sheet and the adhesive resin, typically, the adhesive resin is an ultraviolet hardening resin which is hardened by being irradiated with ultraviolet rays. Specifically speaking, an ultraviolet hardening resin of an acrylate system, a thiol system, an epoxy system, a silicon system, or the like can be used. In case of using the ultraviolet hardening resin as an adhesive resin, typically, the adhesive resin is hardened at least by irradiating the ultraviolet rays. In the invention, a preferable hardening method is selected in the resin selected as an adhesive resin.

According to the invention constructed as mentioned above, the substrate in which the clamping area which has high flatness and can assure a high frictional force can be provided in the inner peripheral portion of the substrate on the recording surface side, and the light transmitting layer can be formed on the recording surface side can be manufactured.

DETAILED DESCRIPTION OF THE PRESENTLY PREFERRED EMBODIMENTS

Figure 1:
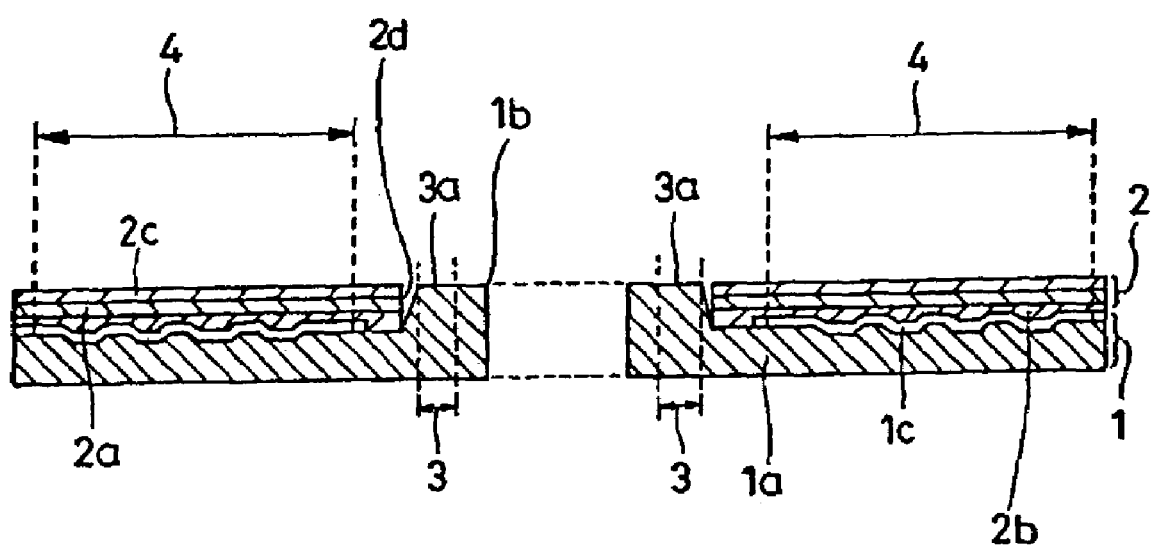
FIG. 1 is a cross sectional view showing an optical disc according to the first embodiment of the invention.

An embodiment of the invention will be described hereinbelow with reference to the drawings. In all drawings of the following embodiments, the same or corresponding portions are designated by the same reference numerals.

First, an optical disc according to the first embodiment of the invention will be described. FIG. 1 shows the optical disc according to the first embodiment.

As shown in FIG. 1, in the optical disc according to the first embodiment, a disc substrate 1 is constructed in a manner such that a center hole 1b is formed in a center portion of a disc-shaped replica substrate 1a and an information signal portion 1c is provided on one principal plane on which concave and convex portions have been formed. A light transmitting layer 2 is formed on the disc substrate 1. A clamping area 3 is set around the center hole 1b.

The periphery of the center hole 1b of the replica substrate 1a is constructed so that its thickness is larger than that of an information recording area 4 in which the light transmitting layer 2 has been formed. Thus, the replica substrate 1a has what is called a convex shape such that its center portion is thick and its peripheral portion is relatively thin. Around the center hole 1b of the replica substrate 1a, a clamp reference surface 3a which is used in case of setting the optical disc to a spindle of a recording and reproducing apparatus (they are not shown) has been set to a principal plane on the side of the information signal portion 1c in the clamping area 3 which has been set in a ring shape. A substrate thickness of the replica substrate 1a in the clamping area 3 in the periphery of the center hole 1b is selected to a value within a range of, for example, 1.1 to 1.3 mm. In the first embodiment, it is selected to, for example, 1.2 mm. A diameter of the innermost rim of the clamping area 3 is selected from a range of 22 to 24 mm. In the first embodiment, it is selected to, for example, 23 mm. A diameter of the outermost rim of the ring-shaped clamping area 3 is selected from a range of 32 to 34 mm. In the first embodiment, it is selected to, for example, 33 mm.

The light transmitting layer 2 is constructed in a manner such that a light transmitting sheet 2a is adhered via an adhesive layer 2b onto one principal plane of the disc substrate 1 on the side where the information signal portion 1c has been provided and a hard coating layer 2c is provided on the surface of the light transmitting sheet 2a on the side opposite to the side where the adhesive layer 2b has been provided. Each of the layers constructing the light transmitting layer 2 is made of a material which can transmit at least a laser beam which is used for recording and reproduction. A through-hole 2d is formed in a center portion of the light transmitting layer 2. When considering that the light transmitting sheet 2a is adhered onto the disc substrate 1 via the adhesive layer 2b, a diameter of the through-hole 2d is set to be larger than the outermost rim diameter of the clamping area 3. Specifically speaking, it is set to, for example, 34 mm or more.

The optical disc constructed as mentioned above is an optical disc of a type such that an information signal is recorded and/or reproduced by irradiating a laser beam onto the disc substrate 1 from the side where the information signal portion 1c exists toward the information signal portion 1c in a predetermined portion in the information recording area 4. The foregoing optical disc is constructed in a manner such that the substrate thickness in the clamping area 3 of the disc substrate 1 is almost equal to the total of the substrate thickness of the disc substrate 1 in the information recording area 4 and the film thickness of the light transmitting layer 2. That is, the optical disc is constructed in a manner such that a height of clamp reference surface 3a is almost equal to that of the surface of the light transmitting layer 2 from the surface of the disc substrate 1 on the side opposite to the side where the information signal portion 1c has been provided.

Figure 2:
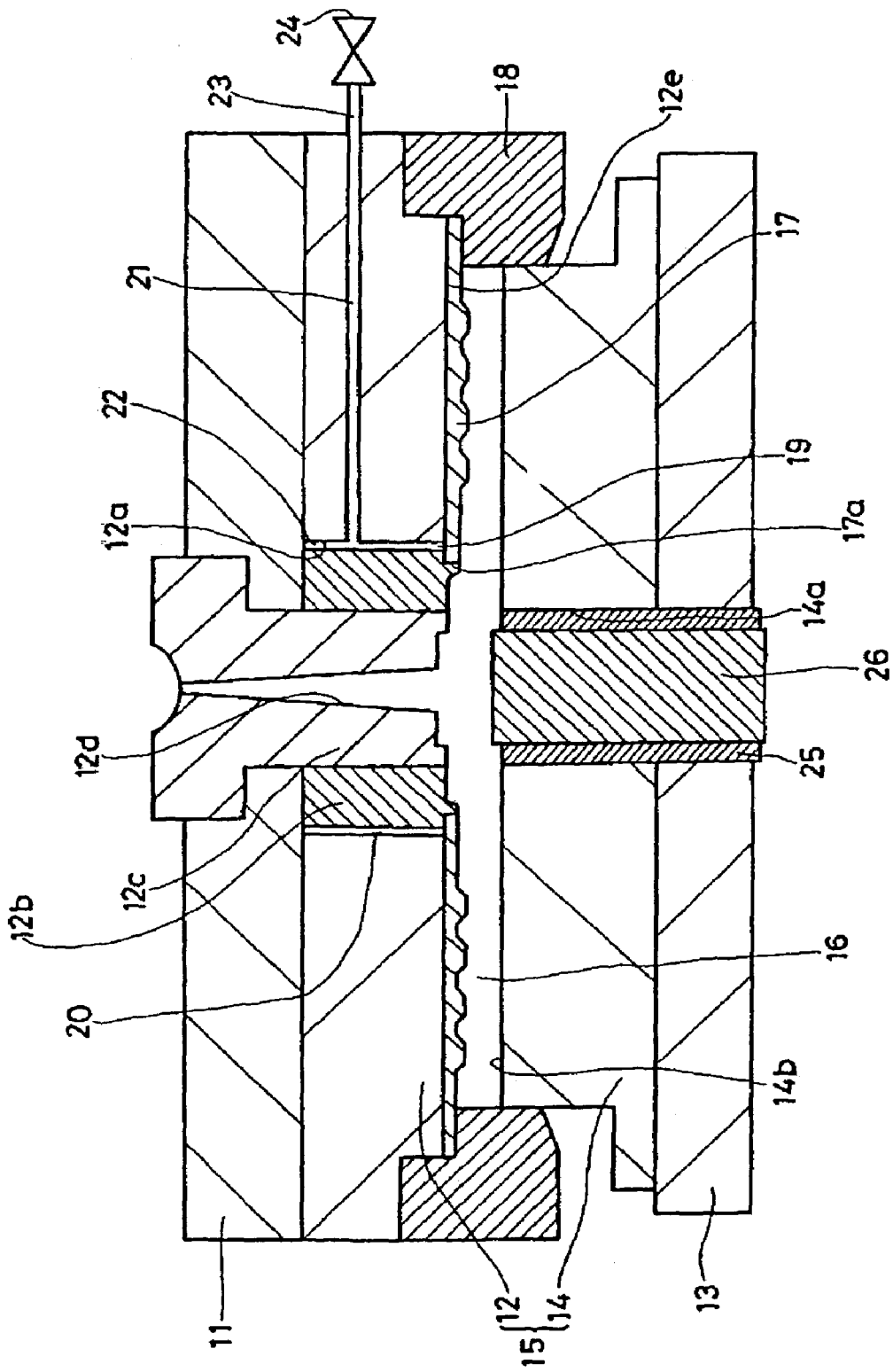
FIG. 2 is a cross sectional view showing an injection molding apparatus for molding a disc-shaped substrate according to the first embodiment of the invention.
Figure 3:
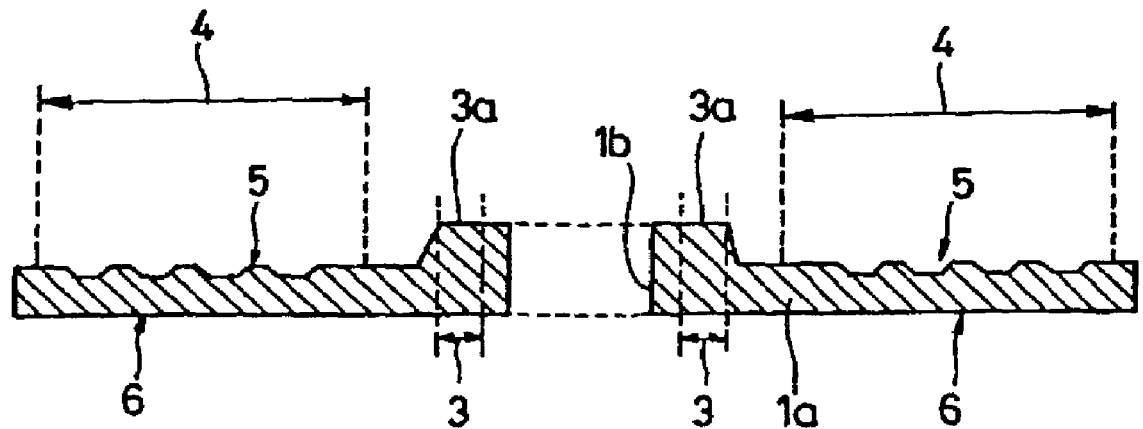
FIG. 3 is a cross sectional view showing a replica substrate which is molded by the injection molding apparatus for molding the disc-shaped substrate according to the first embodiment of the invention.

A manufacturing method of the optical disc according to the first embodiment constructed as mentioned above will now be described. First, an injection molding apparatus for molding a disc-shaped substrate which is used for manufacturing of the disc-shaped replica substrate 1a according to the first embodiment will be described. FIG. 2 shows the injection molding apparatus for molding the disc-shaped substrate. FIG. 3 shows the replica substrate 1a.

As shown in FIG. 2, the injection molding apparatus for molding the disc-shaped substrate according to the first embodiment is constructed so as to have a die 15 in which a fixed die 12 fixed to a stationary platen 11 and a movable die 14 fixed to a stationary platen 13 are arranged so as to face each other. When the fixed die 12 and movable die 14 are set so as to face each other, a cavity 16 for molding is formed in a gap between the fixed die 12 and the movable die 14. The molding cavity 16 constructs, for example, a disc shape and a shape corresponding to the replica substrate 1a which is molded and shown in FIG. 3 is constructed. Details regarding the replica substrate 1a which is molded will be explained hereinlater.

In the fixed die 12 shown in FIG. 2, a through-hole 12a is formed perpendicularly to a lower surface of the fixed die 12 at a center position of a surface portion of the fixed die 12 on the side where the molding cavity 16 is constructed, that is, a center position of the lower surface portion of the fixed die 12. For example, a sprue bush supporting ring 12b having a cylindrical shape pierces the through-hole 12a and is provided therein.

The sprue bush supporting ring 12b of the fixed die 12 has a shape such that a front edge side which faces the molding cavity 16 is inserted into the fixed die 12 side. A sprue bush 12c is fitted to the sprue bush supporting ring 12b.

As shown in FIG. 2, the sprue bush 12c fitted to the sprue bush supporting ring 12b has a columnar shape. The sprue bush 12c has a resin injection hole 12d formed along a center axis of the columnar shape. The resin injection hole 12d is used to inject a synthetic resin material such as a fused polycarbonate resin or the like which is supplied from an injecting apparatus (not shown) into the molding cavity 16 so as to flow therein. The sprue bush 12c has a shape such that its front edge portion is inserted from the molding cavity 16 to the fixed die 12 side. The front edge portion of the sprue bush 12c in which an opening edge of the resin injection hole 12d has been formed faces the molding cavity 16. An outer peripheral side of this front edge portion constructs the same surface as the portion where the sprue bush supporting ring 12b has been inserted. The sprue bush supporting ring 12b is constructed in a manner such that one end portion of this ring on the side where it faces the molding cavity 16 has a ring convex shape comprising a portion which constructs the same surface as a stamper, which will be explained hereinlater, and a portion which constructs the same surface as a lower surface of the sprue bush 12c and the other end portion has a flange-shaped collar portion. An inner peripheral side of one end portion of the sprue bush supporting ring 12b and an outer peripheral side of one end portion of the sprue bush 12c construct a lower surface portion of the fixed die 12. The inner peripheral side of the one end portion of the sprue bush supporting ring 12b and the outer peripheral side of the one end portion of the sprue bush 12c construct an inner surface portion of the molding cavity 16 and become a surface portion of the replica substrate 1a shown in FIG. 3 for molding the clamp reference surface 3a.

As shown in FIG. 2, a stamper 17 is attached to the lower surface portion of the fixed die 12, that is, the surface portion of the fixed die 12 on the side where it faces the movable die 14. The stamper 17 is used to form, for example, a concave and convex pattern corresponding to the information signal, pregrooves constructing recording tracks, or the like onto the replica substrate 1a. The stamper 17 is made of, for example, nickel (Ni) or the like. The stamper 17 is formed in a plane ring shape having a center hole 17a in a center portion. A mirror portion constructed so as to have a flat surface is provided in a portion of the center hole 17a which faces the peripheral movable die 14. A diameter of the center hole 17a (bore of the stamper 17) is set to be larger than the outermost rim diameter of the clamping area 3 of the replica substrate 1a in order to mold the clamp reference surface 3a of the replica substrate 1a shown in FIG. 3 by the inner peripheral portion of the lower surface of the sprue bush supporting ring 12b and the outer peripheral portion of the lower surface of the sprue bush 12c.

The cavity 16 for molding which is constructed when the fixed die 12 and movable die 14 are arranged so as to face each other is constructed in a manner such that an interval between the inner peripheral side of the lower edge surface of the sprue bush supporting ring 12b and the lower edge outer peripheral side of the sprue bush 12c and the upper surface 14b of the movable die 14 in a portion of the replica substrate 1a shown in FIG. 3 where the clamp reference surface 3a is located is larger than an interval between the lower surface of the stamper 17 and an upper surface 14b of the movable die 14 in a portion of the replica substrate 1a shown in FIG. 3 where the information recording area 4 is located.

As shown in FIG. 2, the stamper 17 is positioned by fitting the center hole 17a formed in the center portion to the outside of the front edge portion of the sprue bush supporting ring 12b. That is, the diameter of the center hole 17a (bore of the stamper 17) corresponds to an outer diameter of the ring convex shape in the front edge portion of the sprue bush supporting ring 12b. The stamper 17 is supported by a stamper outer peripheral holder 18 attached to the fixed die 12 in a manner such that its outer peripheral edge side is sandwiched between the fixed die 12 and the holder 18. The stamper outer peripheral holder 18 is formed in a ring shape and attached to the outer peripheral side portion on the lower surface side of the fixed die 12, thereby constructing the outer peripheral edge portion of the molding cavity 16.

A stamper sucking mechanism serving as stamper sucking means is provided for the fixed die 12. The stamper sucking mechanism is constructed in a manner such that air existing between the fixed die 12 and the stamper 17 is exhausted to the outside by a vacuum pump (not shown) via suction holes 19 formed on the periphery of the front edge portion of the sprue bush supporting ring 12b at a lower surface 12e of the fixed die 12.

The suction holes 19 are located outside of the outermost rim of the clamping area 3 in the replica substrate 1a which is molded by using the injection molding apparatus for molding the disc-shaped substrate, that is, they are located on the outer peripheral side of the center hole 17a of the stamper 17. A plurality of suction holes 19 are arranged in a circumferential shape and formed. In the first embodiment, a radius of the circumferential shape on which the suction holes 19 are arranged and formed is equal to, for example, 34.3 mm. For example, 20 suction holes 19 are arranged and formed along this circumference. An opening diameter of each suction hole 19 is equal to, for example, 0.2 mm. As suction holes 19, it is also possible to form ring-shaped gap portions between the front edge portion of the sprue bush supporting ring 12b and the lower surface 12e of the fixed die 12 and use suction slits arranged in those gap portions.

The suction holes 19 are communicated with a gas emission path 20 provided between an outside surface of the sprue bush supporting ring 12b and an inner wall surface of the through-hole 12a of the fixed die 12. The gas emission path 20 is communicated with the outside via a tunnel portion 21 formed in the fixed die 12. The tunnel portion 21 is formed from the center side of the fixed die 12 toward the outside surface in the radial direction of the molding cavity 16. An upper edge side of the gas emission path 20, that is, a gap portion 22 between a rear edge portion of the sprue bush supporting ring 12b and the upper surface portion of the fixed die 12 is closed by the stationary platen 11 via an O-ring (not shown).

A vacuum hose 23 is attached to the outside surface portion of the fixed die 12 so as to be communicated with the tunnel portion 21. The vacuum hose 23 is connected to a vacuum pump (not shown) via a valve apparatus 24. That is, when the valve apparatus 24 is opened, the vacuum pump sucks air existing between the lower surface 12e of the fixed die 12 and the stamper 17 and exhausts it to the outside via the vacuum hose 23, tunnel portion 21, gas emission path 20, and suction holes 19. A suction pressure is set to, for example, $1.4 \times 10^3$ Pa ($\frac{1}{72}$ atm). By closing the valve apparatus 24, the gap existing between the lower surface 12e of the fixed die 12 and the stamper 17 is set into a closing state against the outside. At this time, the stamper 17 is sucked and held to the lower surface 12e.

A through-hole 14a is formed at a center position of the movable die 14 so as to be perpendicular to the upper surface portion of the movable die 14. That is, the through-hole 14a is formed at a position which faces the front edge surface of the sprue bush 12c supported by the fixed die 12. A sleeve 25 having a cylindrical shape pierces the through-hole 14a formed in the movable die 14 and is arranged in the through-hole 14a. Further, a columnar punch 26 is inserted and arranged into the sleeve 25. The punch 26 can be moved forward and backward to/from the sleeve 25 and is supported by the sleeve 25. The sleeve 25 is supported by the movable die 14 so as to be movable forward and backward to/from the movable die 14. A front edge surface of the sleeve 25 which faces the molding cavity 16 is inserted into the movable die 14 slightly downwardly from the upper surface portion of the movable die 14. A front edge surface of the punch 26 which faces the molding cavity 16 is projected slightly upwardly from the front edge surface of the sleeve 25.

A method of manufacturing the replica substrate 1a shown in FIG. 3 by using the die apparatus for molding a disc-shaped substrate constructed as mentioned above will now be described. In the injection molding of the replica substrate 1a, as a stamper 17, a stamper whose thickness is equal to or larger than 0.45 mm, preferably, 0.5 mm or more and whose bore is larger than the outermost rim diameter of the clamping area 3 is used. In the first embodiment, the stamper 17 whose thickness is equal to, for example, 0.5 mm, whose bore is equal to, for example, 22 mm, and which is made of, for example, Ni is used.

First, the molding cavity 16 is formed by arranging the movable die 14 so as to face the fixed die 12. A fused synthetic resin material such as PC or the like is injected into the molding cavity 16 from the foregoing injecting apparatus (not shown) via the resin injection hole 12d of the sprue bush 12c so as to be filled in the cavity 16. At this time, in the molding cavity 16, the synthetic resin material in the fused state flows from the center portion toward the outer peripheral side. By moving the movable die 14 toward the fixed die 12 side, closing to compress the synthetic resin material filled in the molding cavity 16 is executed. After that, the synthetic resin material is solidified by cooling. Thus, the replica substrate 1a corresponding to the molding cavity 16 is formed. At this time, the clamp reference surface 3a on one principal plane side of the clamping area 3 of the replica substrate 1a is molded by the outer peripheral side of the lower surface portion of the sprue bush supporting ring 12b and the inner peripheral side of the lower surface portion of the sprue bush 12c.

The center hole 1b of the replica substrate 1a is formed by projecting the punch 26 to the fixed die 12 side. After that, opening for removing the movable die 14 so as to be away from the fixed die 12 is executed while the sleeve 25 is projected to the fixed die 12 side. Thus, the molded replica substrate 1a is away from the die 15. By removing the replica substrate 1a so as to be away from the fixed die 12, the molding of the disc-shaped substrate is completed.

As shown in FIG. 3, the replica substrate 1a molded as mentioned above is constructed in a manner such that a thickness of a peripheral portion of the center hole 1b is larger than that in the information recording area 4. The clamp reference surface 3a serving as a reference surface at the time when the optical disc is put to the spindle of the recording and reproducing apparatus (they are not shown in FIG. 3) is set into the inner peripheral portion of a recording surface 5 on the inside of the information recording area 4. The innermost rim diameter of the clamping area 3 which is set by the clamp reference surface 3a is equal to, for example, 23 mm and the outermost rim diameter is equal to, for example, 33 mm. The information recording area 4 to which the concave and convex portions which form a mirror image in correspondence to the stamper 17 have been transferred is formed on the recording surface 5 of the replica substrate 1a and a mirror surface 6 is formed on the side opposite to the recording surface 5.

Subsequently, the information signal portion 1c is formed onto the recording surface 5 of the replica substrate 1a shown in FIG. 3 on which the concave and convex portions have been formed. The information signal portion 1c is constructed by forming a reflective film, a film made of a magnetooptic material, a film made of a phase change material, an organic pigment film, or the like onto the concave/convex recording surface 5 in the information recording area 4. Among them, for example, Al or the like is used as a material of the reflective film. Specifically speaking, if the optical disc as a final product is a read only (ROM (Read Only Memory)) type optical disc, the information signal portion 1c is constructed by a single-layer film or a laminate film having at least the reflective film made of, for example, Al or the like. On the other hand, if the optical disc as a final product is a rewritable type optical disc, the information signal portion 1c is constructed by a single-layer film or a laminate film having at least a film made of a magnetooptic material or a film made of a phase change material. In case of the write-once type optical disc, the information signal portion 1c is constructed by a single-layer film or a laminate film having at least a film made of an organic pigment material or a film made of a write-once type phase change material.

The replica substrate 1a according to the first embodiment comprises a disc-shaped PC substrate such that, for example, a thickness of at least the clamping area 3 is equal to 1.2 mm and a thickness of the information recording area 4 is equal to 1.1 mm. A diameter (outer diameter) of the replica substrate 1a is equal to, for example, 120 mm and an opening diameter (bore) of the center hole 1b is equal to, for example, 15 mm. The information signal portion 1c on one principal plane of the replica substrate 1a is a laminate film obtained by sequentially laminating a first dielectric layer having a film thickness of 18 nm and comprising a mixture ($ZnS-SiO_2$) of zinc sulfide (ZnS) and silicon oxide ($SiO_2$), a phase change recording layer having a film thickness of 24 nm and comprising a GeSbTe alloy layer, and a second dielectric layer having a film thickness of 100 nm and comprising $ZnS-SiO_2$ onto a reflective layer having a film thickness of 100 nm and comprising an Al alloy.

Subsequently, the light transmitting layer 2 is formed onto the disc substrate 1 on which the information signal portion 1c has been formed. First, a sheet which is used to form the light transmitting layer 2 according to the first embodiment will be described. A sheet 7 according to the first embodiment is shown in FIG. 4.

Figure 4:
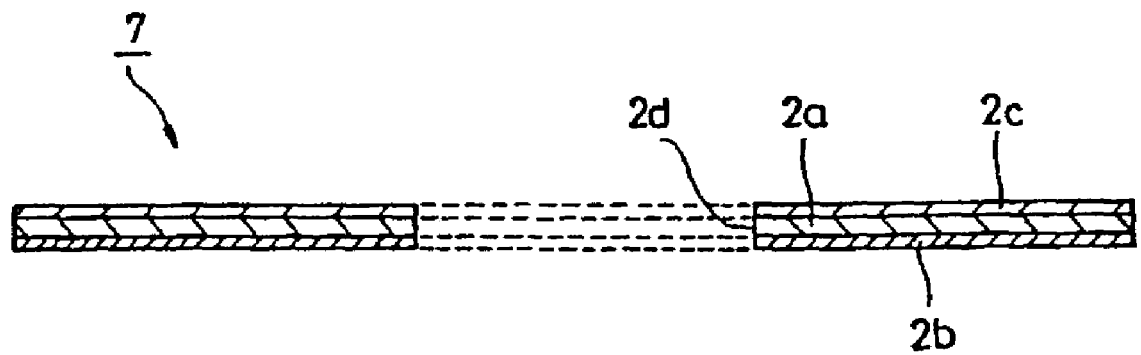
FIG. 4 is a cross sectional view showing a sheet which is used when a light transmitting layer of the optical disc according to the first embodiment of the invention is formed.

As shown in FIG. 4, the sheet 7 which is used to manufacture the optical disc according to the first embodiment has a structure such that it is punched and formed in a plane ring shape and the through-hole 2d is formed at a center in a manner similar to the replica substrate 1a. Dimensions of the light transmitting sheet 2a are set in a manner such that a diameter (outer diameter) of the light transmitting sheet 2a is set to be smaller than the outer diameter of the replica substrate 1a and set to, for example, 119 mm, and a diameter (bore) of the through-hole 2d is set to be larger than the outermost rim diameter (for example, 33 mm diameter) of at least the clamping area 3 and set to, for example, 34 mm. The light transmitting sheet 2a is made of, for example, a thermoplastic resin which is used at least for recording and reproduction of the optical disc and has light transmitting performance for the laser beam. Specifically speaking, the thermoplastic resin is, for example, polycarbonate (PC) or a methacrylic resin such as polymethyl methacrylate (polymethacrylic methyl) or the like. It is preferable that the light transmitting sheet is made of the same kind of material as that of the replica substrate 1a. A thickness of the light transmitting sheet 2a is equal to, for example, 70 μm. The thickness of the light transmitting sheet 2a is determined in consideration of the film thickness of the light transmitting layer 2.

Figure 5:
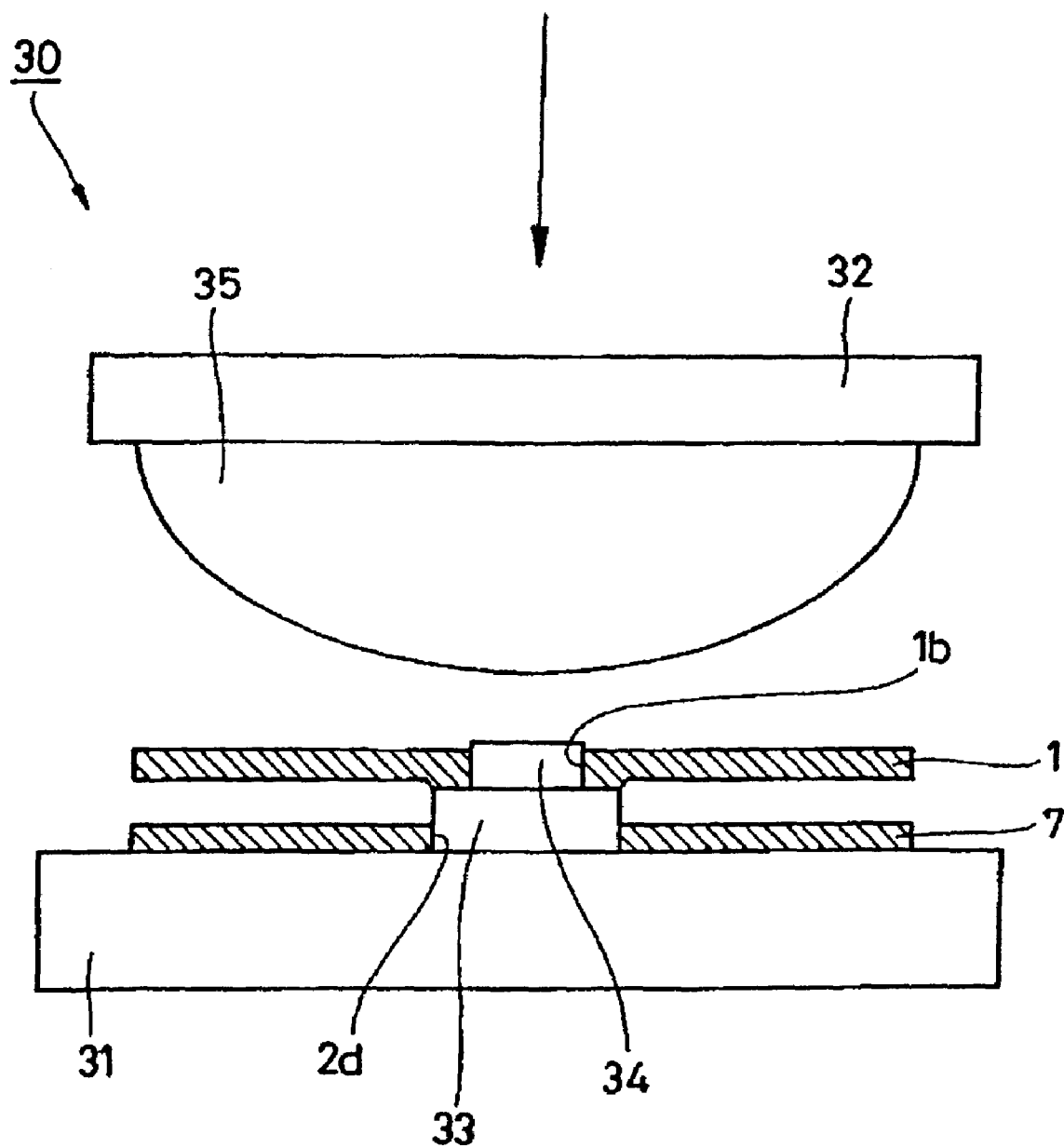
FIG. 5 is a schematic diagram showing an adhering apparatus which is used to adhere the disc substrate and the sheet according to the first embodiment of the invention.

A forming method of the light transmitting layer 2 using the sheet 7 formed as mentioned above will now be described. First, a laminating apparatus which is used to form the light transmitting layer 2 according to the first embodiment will be described. FIG. 5 shows such a laminating apparatus.

As shown in FIG. 5, a laminating apparatus 30 according to the first embodiment is constructed by attaching a fixed stage 31 and a movable stage 32 to positions which face each other.

The fixed stage 31 is used to mount the sheet 7 serving as a light transmitting layer 2 and constructed so that the sheet 7 can be put thereon. That is, a vertical motion pin 33 which is movable in such a direction as to be projected and inserted from/into the fixed stage 31 is provided in a portion of the fixed stage 31 which faces the movable stage 32. A diameter of the vertical motion pin 33 is equal to the diameter of the through-hole 2d of the sheet 7 mentioned above. By fitting the through-hole 2d of the sheet 7 to the vertical motion pin 33, the sheet 7 can be put onto the fixed stage 31. A substrate positioning pin 34 which projects in a columnar shape is attached onto the vertical motion pin 33. A diameter of the substrate positioning pin 34 is almost equal to the diameter of the center hole 1b of the disc substrate 1 mentioned above. The substrate positioning pin 34 can support the disc substrate 1 by the vertical motion pin 33 while aligning the center of the disc substrate 1. In the fixed stage 31 constructed as mentioned above, the sheet 7 can be put by fitting to the vertical motion pin 33 and the disc substrate 1 can be supported by the vertical motion pin 33 by fitting the disc substrate 1 to the substrate positioning pin 34.

A pad 35 made of, for example, an elastic member such as rubber or the like is attached onto the surface of a portion of the movable stage 32 which faces the fixed stage 31. The pad 35 has, for example, a partial spherical shape comprising one of the portions obtained by dividing a sphere by a predetermined plane or a conical shape. A cross sectional portion or a plane portion is fixed to a principal plane of the movable stage 32 which faces the fixed stage 31. Rubber hardness of the pad 35 is equal to, for example, 60.

The laminating apparatus 30 according to the first embodiment is constructed as mentioned above.

Subsequently, the disc substrate 1 and sheet 7 are laminated by using the laminating apparatus 30 constructed as mentioned above. That is, first, the sheet 7 is put onto the fixed stage 31 in a manner such that the through-hole 2d is fitted to the vertical motion pin 33. At this time, the sheet 7 is put in a manner such that the adhesive layer 2b side of one of the surfaces of the sheet faces the movable stage 32. After that, the disc substrate 1 is put so as to be supported by the vertical motion pin 33 while it is fitted to the substrate positioning pin 34. At this time, the disc substrate 1 is supported by the vertical motion pin 33 and put in a manner such that the principal plane on which the information signal portion 1c has been provided, that is, the recording surface on which the clamp reference surface 3a has been set faces the adhesive layer 2b.

Subsequently, the movable stage 32 is moved toward the fixed stage 31 (downwardly in FIG. 5). First, the substrate positioning pin 34 is pressed by the pad 35. After that, the vertical motion pin 33 is inserted into the fixed stage 31 through the disc substrate 1. Thus, the principal plane of the disc substrate 1 on which the information signal portion 1c has been provided and the adhesive layer 2b of the sheet 7 are adhered with pressure. After the adhesion was stabilized, the movable stage 32 is released in such a direction as to be away from the fixed stage 31. After that, the disc substrate 1 and sheet 7 which were adhered are removed from the fixed stage 31.

Thus, the light transmitting layer 2 is formed onto the disc substrate 1 and the desired optical disc shown in FIG. 1 is manufactured.

Figure 6:
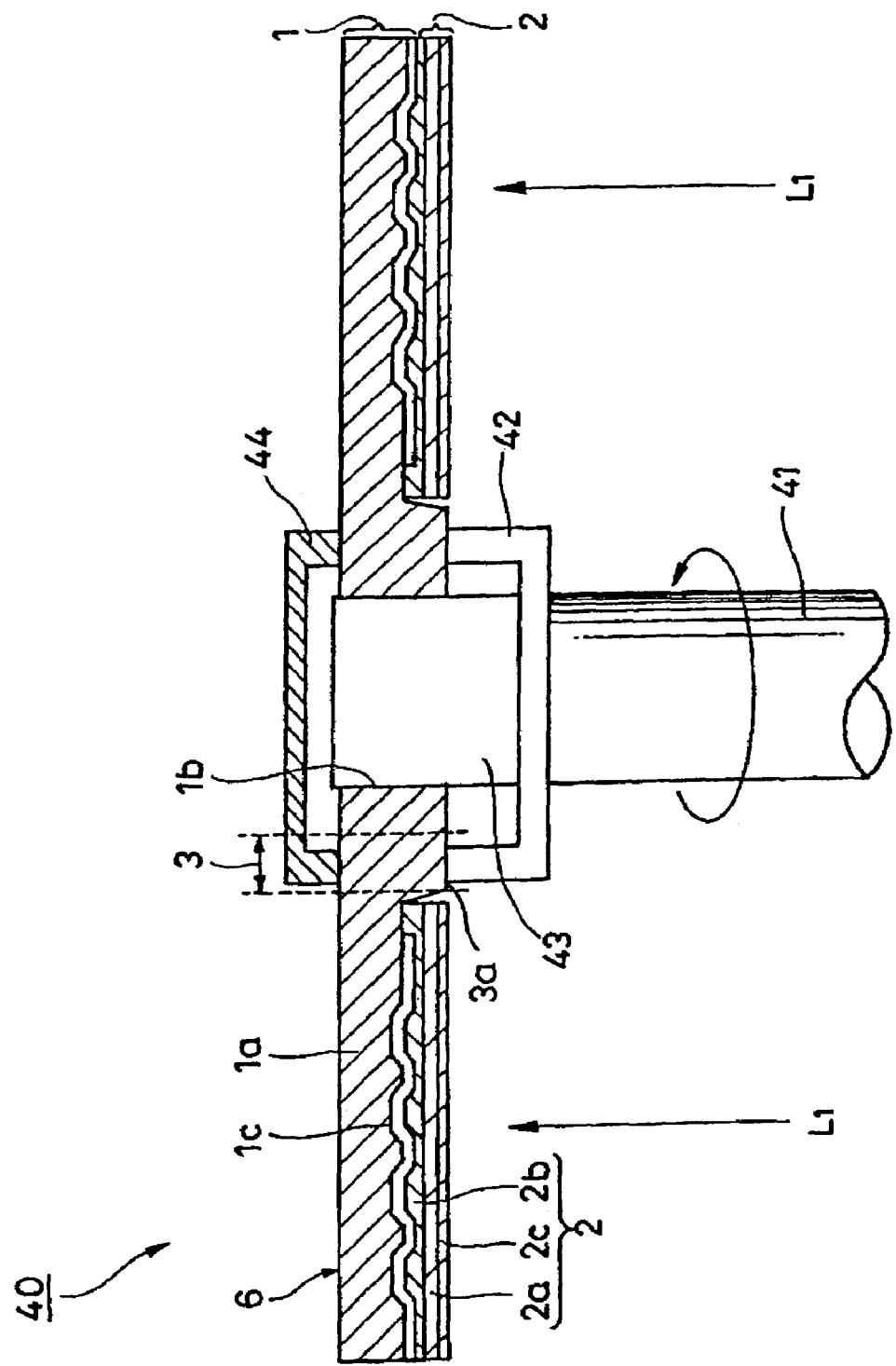
FIG. 6 is a cross sectional view showing chucking means for clamping the optical disc according to the first embodiment of the invention is formed.

A case where the optical disc constructed as mentioned above is clamped by a chucking portion will now be described. FIG. 6 shows a chucking portion according to the first embodiment.

As shown in FIG. 6, in a chucking portion 40 according to the first embodiment, a disc mounting table 42, a center positioning pin 43, and a magnetic metal plate 44 are sequentially coupled and provided in an upper portion of a rotary shaft 41.

The rotary shaft 41 is coupled with a motor (not shown) and can be rotated around a center in a cross sectional plane that is perpendicular to the longitudinal direction of the rotary shaft 41.

The disc mounting table 42 is used to mount the optical disc. The optical disc is put onto the disc mounting table 42 while coming into contact with the principal plane of the disc substrate 1 in the clamping area 3, that is, the clamp reference surface 3a. The upper surface of the disc mounting table 42 onto which the optical disc is put has a ring shape, its innermost rim diameter is equal to, for example, 26 mm, and its outermost rim diameter is equal to, for example, 32 mm. For example, a permanent magnet (not shown) has been inserted in the disc mounting table 42 and, specifically speaking, the permanent magnet is coated with a resin such as polyimide or the like.

The center positioning pin 43 is used to position the center of the optical disc. The center positioning pin 43 is constructed so that it can be inserted into a center hole of the optical disc (center hole 1b of the disc substrate 1) and its center coincides almost with an auto-rotational center of the rotary shaft 41.

The magnetic metal plate 44 is made of a magnetic material and used to clamp the optical disc put on the disc mounting table 42 from the mirror surface 6 side of the disc substrate 1. A cross sectional surface of the magnetic metal plate 44 which is parallel with the mounting surface of the disc mounting table 42 has a ring shape. An innermost rim diameter of the ring shape is equal to, for example, 26 mm and an outermost rim diameter is equal to, for example, 32 mm.

The chucking portion 40 is constructed in a manner such that in the clamping area 3, the optical disc is clamped by the disc mounting table 42 which is in contact with the clamp reference surface 3a and the magnetic metal plate 44 which is in contact with the mirror surface 6 side and this optical disc can be clamped. A force which is applied when the optical disc is clamped by the disc mounting table 42 and magnetic metal plate 44, that is, a clamping force is equal to, for example, 2N in case of the consumer use and to, for example, 10N in case of the industrial use.

The optical disc is clamped by the chucking portion 40 constructed as mentioned above. The recording and reproduction to/from the information signal portion 1c are executed by a method whereby a laser beam L1 which has been emitted from a semiconductor laser (not shown) and passed through a lens in 2 groups is irradiated to the information signal portion 1c from the light transmitting layer 2 side of the optical disc. As a semiconductor laser serving as a light source of the laser beam, it is possible to mention a GaN system semiconductor laser (a band of a light emitting wavelength of 400 nm; blue light emission), a ZnSe system semiconductor laser (a band of a light emitting wavelength of 500 nm; green), an AlGaInP system semiconductor laser (light emitting wavelength of about 635 to 680 nm; red), or the like.

As described above, according to the first embodiment, the replica substrate 1a in which the thickness of the periphery of the center hole 1b is larger than that in the information recording area 4 is injection-molded by the injection molding apparatus for molding the disc-shaped substrate, and the clamp reference surface 3a is set to the recording surface 5 side in the portion of the disc substrate 1 in which the thickness of the periphery of the center hole 1b is large, so that the clamp reference surface 3a can be made of the substrate material. Therefore, even in case of clamping and rotating the optical disc in which the lubricating performance of the surface of the light transmitting layer 2 has been improved, the race of the optical disc can be prevented, and rigidity of the disc substrate 1, that is, the optical disc can be improved. Since the substrate thickness of the periphery of the center hole 1*b* of the replica substrate 1*a* is set to be larger than the conventional substrate thickness, that is, the substrate thickness in the information recording area 4, a large C plane can be assured on the recording surface 5 side near the center hole 1*b*. Therefore, burrs which are caused when the center hole 1*b* of the disc substrate 1 is formed by the punch 26 of the injection molding apparatus for molding the disc-shaped substrate can be easily removed. The clamp reference surface 3*a* which has been flattened at high precision and has high flatness can be formed. Eccentricity upon rotation of the optical disc can be suppressed. Therefore, the thin light transmitting layer 2 is provided on the principal plane side of the replica substrate 1*a* and, also in the case where the optical disc to/from which the information signal is recorded and/or reproduced by irradiating the laser beam from the light transmitting layer 2 side is put to the spindle of the recording and reproducing apparatus or the reproducing apparatus, the optical disc can be rotated at high precision. In the optical disc, therefore, precision and reliability at which the recording and/or reproduction can be sufficiently performed can be assured, and its recording characteristics and reproducing characteristics can be improved.

Figure 7:
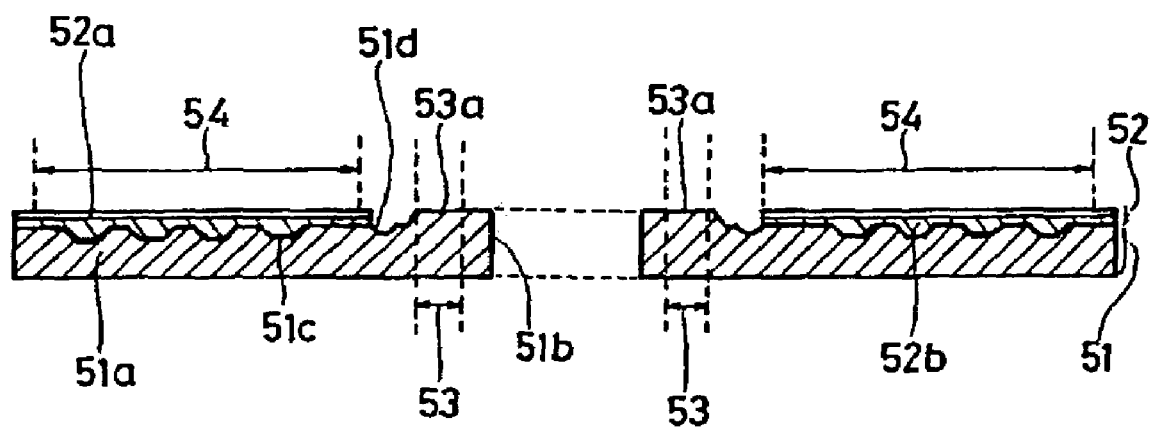
FIG. 7 is a cross sectional view showing an optical disc according to the second embodiment of the invention.

An optical disc according to the second embodiment of the invention will now be described. FIG. 7 shows the optical disc according to the second embodiment.

As shown in FIG. 7, in the optical disc according to the second embodiment, a disc substrate 51 is constructed in a manner such that a center hole 51*b* is formed in a center portion of a disc-shaped replica substrate 51*a* and an information signal portion Sic is provided on one principal plane on which concave and convex portions have been formed. A light transmitting layer 52 is formed on the principal plane of the disc substrate 51.

The periphery of the center hole 51*b* of the replica substrate 51*a* is constructed so that its thickness is larger than that of an information recording area 4 in which the light transmitting layer 52 has been formed. Thus, the replica substrate 51*a* has what is called a convex shape such that its center portion is thick and its peripheral portion is relatively thin. Around the center hole 51*b* of the replica substrate 51*a*, a clamping area 53 is set in a ring shape. A clamp reference surface 3*a* which is used in case of putting the optical disc to the spindle of the recording and reproducing apparatus (they are not shown) has been set to a principal plane on the side of the information signal portion 51*c* in the clamping area 53. An innermost rim diameter of the ring-shaped clamping area 53 is selected from a range of 22 to 24 mm. In the second embodiment, it is selected to, for example, 23 mm. An outermost rim diameter of the clamping area 53 is selected from a range of 32 to 34 mm. In the second embodiment, it is selected to, for example, 33 mm. In the optical disc according to the second embodiment, unlike the case of the first embodiment, a stamper pressing groove 51*d* formed upon injection molding, which will be explained hereinlater, is formed on the surface of the replica substrate 51*a* where the clamp reference surface 53*a* has been set, that is, in a portion on the outer side from the outermost rim of the clamping area 53, namely, a portion on the inner side from the innermost rim of an information recording area 54 where the information signal is recorded.

The light transmitting layer 52 is constructed in a manner such that a light transmitting sheet 52*a* is adhered via an adhesive layer 52*b* onto one principal plane of the disc substrate 51 on the side where the information signal portion 51*c* has been provided. A through-hole 52*c* is formed in a center portion of the light transmitting layer 52. When considering that the light transmitting sheet 52*a* is adhered onto the disc substrate 51 via the adhesive layer 52*b*, a diameter of the through-hole 52*c* is set to be larger than the outermost rim diameter of the clamping area 53. Specifically speaking, it is set to, for example, 34 mm or more.

The optical disc constructed as mentioned above is an optical disc of a type such that the information signal is recorded and/or reproduced by irradiating the laser beam onto the disc substrate 51 from the side where the information signal portion 51*c* exists toward the information signal portion 51*c* in a predetermined portion in the information recording area 54. The foregoing optical disc is constructed in a manner such that the substrate thickness in the clamping area 3 of the disc substrate 1 is almost equal to the total of the substrate thickness of the disc substrate 1 in the information recording area 4 and the film thickness of the light transmitting layer 2. That is, the optical disc is constructed in a manner such that the height of the clamp reference surface 3*a* is almost equal to that of the surface of the light transmitting layer 2 from the surface of the disc substrate 1 on the side opposite to the side where the information signal portion 1*c* has been provided.

Figure 8:
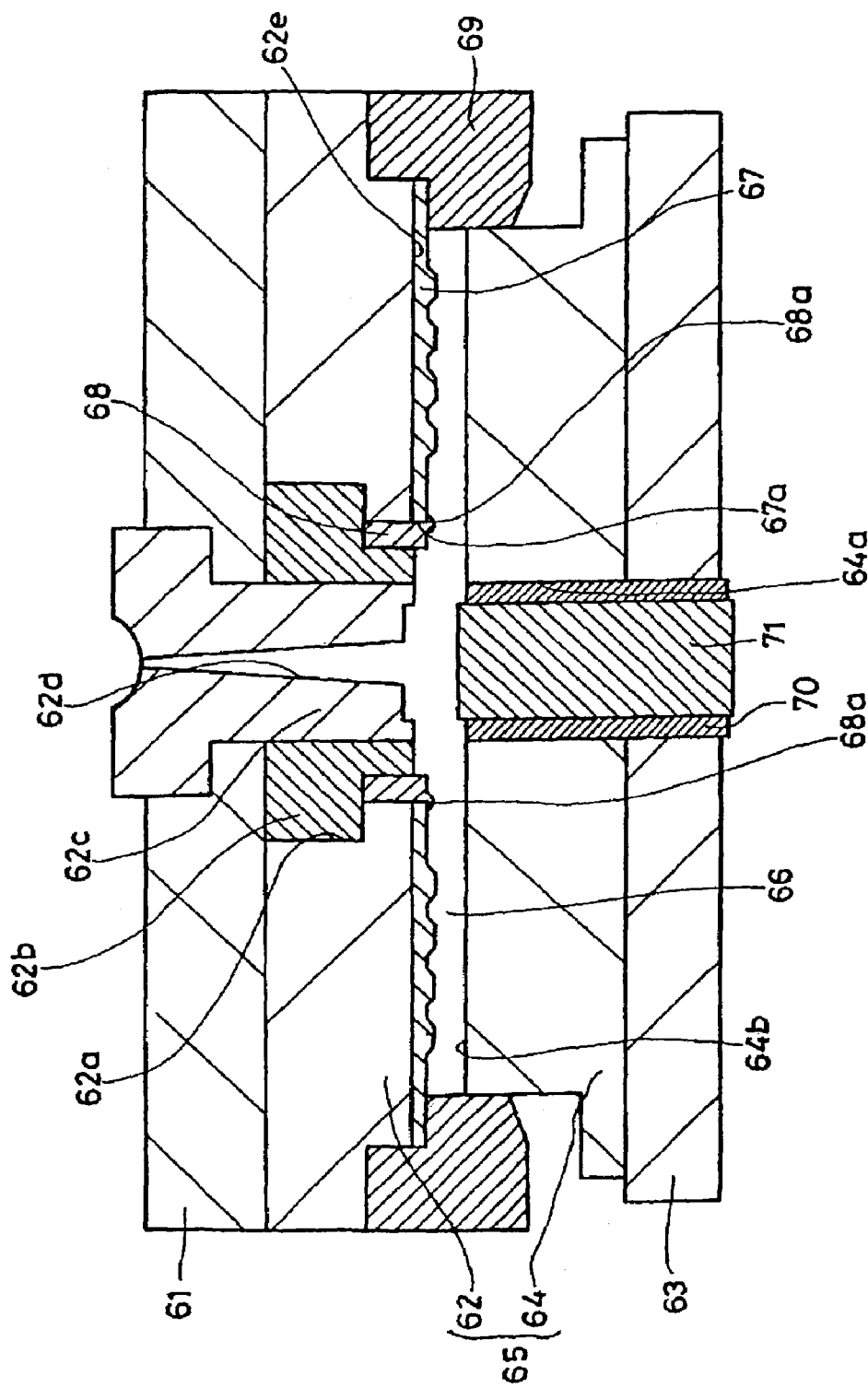
FIG. 8 is a cross sectional view showing an injection molding apparatus for molding a disc-shaped substrate according to the second embodiment of the invention.

Subsequently, an injection molding apparatus for molding a disc-shaped substrate according to the second embodiment of the invention will be described. FIG. 8 shows the injection molding apparatus for molding the disc-shaped substrate according to the second embodiment.

As shown in FIG. 8, the disc-shaped substrate molding injection molding apparatus for molding the disc substrate is constructed so as to have a die 65 in which a fixed die 62 fixed to a stationary platen 61 and a movable die 64 fixed to a stationary platen 63 are arranged so as to face each other. When the fixed die 62 and movable die 64 are set so as to face each other, a cavity 66 for molding is formed in a gap between the fixed die 62 and the movable die 64. The molding cavity 66 has a shape corresponding to the replica substrate 51*a* which is molded and shown in FIG. 9.

A through-hole 62*a* is formed at a center position of the fixed die 62 in the injection molding apparatus for molding the disc-shaped substrate shown in FIG. 8. A sprue bush supporting ring 62*b* having almost a ring shape pierces the through-hole 62*a* and is provided therein.

The sprue bush supporting ring 62*b* of the fixed die 62 has a shape such that a front edge side which faces the molding cavity 66 is inserted into the fixed die 62 side. That is, a shape of the molding cavity 66 which is formed when the fixed die 62 and movable die 64 are arranged so as to face each other is constructed in a manner such that an interval between a lower surface 62*e* of the fixed die 62 and an upper surface of the movable die 64 in a portion of the replica substrate 51*a* where the clamp reference surface 53*a* is located is larger than an interval between the lower surface 62*e* of the fixed die 62 and an upper surface 64*b* of the movable die 64 in a portion of the replica substrate 51*a* shown in FIG. 9 where the information recording area 54 is located. A diameter of a front edge side of the sprue bush supporting ring 62*b* which faces the molding cavity 66 is reduced in a stairway manner. A sprue bush 62*c* is fitted to the sprue bush supporting ring 62*b*.

As shown in FIG. 8, the sprue bush 62*c* fitted to the sprue bush supporting ring 62*b* has a cylindrical shape. The sprue bush 62*c* has a resin injection hole 62*d* formed along a center axis of the cylindrical shape. The resin injection hole 62*d* is used to inject a synthetic resin material such as a fused polycarbonate resin or the like which is supplied from the injecting apparatus (not shown) into the molding cavity 66 so as to flow therein. The sprue bush 62c has a shape such that its front edge portion is inserted from the molding cavity 66 to the fixed die 62 side. The front edge portion of the sprue bush 62c in which an opening edge of the resin injection hole 62d has been formed faces the molding cavity 66. An outer peripheral side of this front edge portion constructs the same surface as the portion where the sprue bush supporting ring 62b has been inserted. The sprue bush supporting ring 62b is constructed in a manner such that its lower surface comprises a portion which becomes the same surface as the lower surface of the sprue bush 62c and the other end portion has a flange-shaped collar portion. A surface (lower surface) of one end portion of the sprue bush supporting ring 62b constructs a lower surface portion of the fixed die 62. That is, the surface (lower surface) of one end portion of the sprue bush supporting ring 62b constructs an inner surface portion of the molding cavity 16 and becomes a surface portion of the replica substrate 51a shown in FIG. 9 where the clamp reference surface 53a is molded.

A stamper 67 is attached to a surface portion of the die constructing the molding cavity 66 of the fixed die 62, that is, the surface portion of the fixed die 62 on the side where it faces the movable die 64. The stamper 67 is used to form, for example, a concave and convex pattern corresponding to the information signal, pregrooves constructing recording tracks, or the like onto the replica substrate 51a. The stamper 67 is made of, for example, Ni or the like. The stamper 67 is formed in a plane ring shape having a center hole 67a in a center portion and formed in a plane ring shape in which a mirror portion constructed so as to have a flat surface is provided in a portion of the center hole 67a which faces the peripheral movable die 64. A diameter of the center hole 67a (bore of the stamper 67) is set to be larger than the outermost rim diameter of the clamping area 53 of the replica substrate 51a in order to mold the clamp reference surface 53a of the replica substrate 51a shown in FIG. 3 by the outer peripheral portion of the lower surface of the sprue bush supporting ring 62b and the outer peripheral portion of the lower surface of the sprue bush 12c.

The stamper 67 is constructed in a manner such that it can be supported by a cylindrical stamper inner peripheral holder 68 at an inner peripheral edge of the center hole 67a and can be supported by a ring-shaped stamper outer peripheral holder 69 at a disc-shaped outer peripheral edge. The stamper 67 is attached to the lower surface 62e of the fixed die 62 by the stamper inner peripheral holder 68 and stamper outer peripheral holder 69. That is, the stamper inner peripheral holder 68 for supporting the peripheral edge of the center hole 67a on the inner peripheral edge side of the stamper 67 is fitted to the outer peripheral side of the sprue bush supporting ring 62b, located on the front edge side of the sprue bush 62c, and attached to the fixed die 62. A claw portion 68a for supporting the stamper is provided in an outer peripheral portion of the stamper inner peripheral holder 68 on the side of the molding cavity 66. The stamper supporting claw portion 68a is used to support a peripheral edge of the center hole 67a.

On the other hand, a through-hole 64a is formed at a center position of the movable die 64. A cylindrical sleeve 70 pierces the through-hole of the movable die 64 and is provided therein. The sleeve 70 is constructed so as to be movable forward and backward into/from the molding cavity 66 and is supported by the movable die 64. A front edge surface of the sleeve 70 which faces the molding cavity 66 is slightly inserted into the movable die 64. A columnar punch 71 is fitted into the cylinder of the sleeve 70. A front edge surface of the punch 71 which faces the molding cavity 66 is slightly projected from the front edge surface of the sleeve 70.

Figure 9:
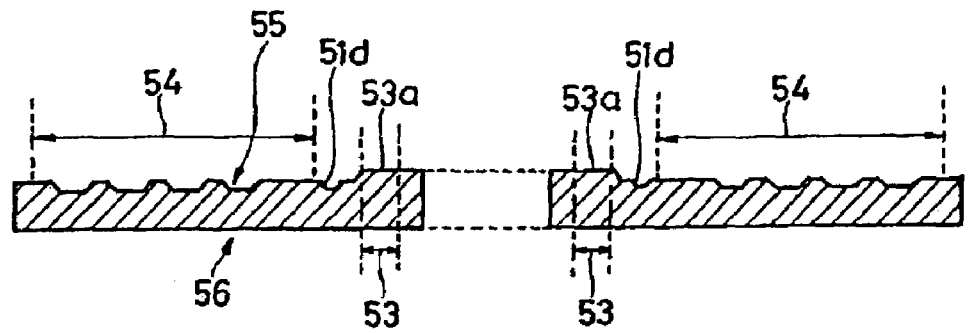
FIG. 9 is a cross sectional view showing a replica substrate which is molded by the injection molding apparatus for molding the disc-shaped substrate according to the second embodiment of the invention.

Since an injection molding method of forming the replica substrate 51a shown in FIG. 9 by using the die apparatus for molding the disc substrate constructed as mentioned above is similar to that in the first embodiment, its description is omitted here. The replica substrate Sla shown in FIG. 9 is formed by this injection molding method. In the injection molding of the replica substrate 51a according to the second embodiment, as a stamper 67, a stamper whose thickness is equal to or larger than 0.45 mm, preferably, 0.5 mm or more and which is made of, for example, Ni is used.

As shown in FIG. 9, a recording surface 55 is provided on one principal plane of the replica substrate 51a and a mirror surface 56 is provided on the other surface in a manner similar to the first embodiment. The clamping area 53 is set in an inner peripheral portion on the recording surface 55 side. The clamp reference surface 53a is set to the recording surface 55 side of the clamping area 53. In the replica substrate 51a according to the second embodiment, unlike the first embodiment, the stamper pressing groove 51d formed by the stamper supporting claw portion 68a upon injection molding is provided on the recording surface 55 of the replica substrate 51a, that is, in the portion on the outer side from the outermost rim of the clamping area 53 and on the inner side from the innermost rim of the information signal portion 51c. Since the other structure of the replica substrate 51a is similar to that of the first embodiment, its description is omitted.

In a manufacturing method of the optical discusing the replica substrate 51a according to the second embodiment, first, in a manner similar to the first embodiment, the information signal portion 51c is formed on the principal plane on which the recording surface 55 of the replica substrate 51a has been formed. Subsequently, the light transmitting layer 52 is formed on the information signal portion 51c by using the laminating apparatus shown in FIG. 4. Thus, the optical disc shown in FIG. 7 is manufactured. In this optical disc, unlike the first embodiment, in the optical disc which is manufactured finally, the stamper pressing groove 51d is formed and left on the outer side of the outermost rim of the clamping area 53 and on the inner side from the innermost rim of the information recording area 54, on the principal plane on the side where the light transmitting layer 52 has been formed.

According to the second embodiment, since the replica substrate 51a of the disc substrate 51 constructing the optical disc has been formed in a convex shape, a high frictional force at the time when the disc is clamped and rotated can be assured on the clamp reference surface 53a, flatness of high precision can be assured, and the surface 53a can have high plane surface performance. Therefore, an effect similar to that in the first embodiment can be obtained.

Figure 10:
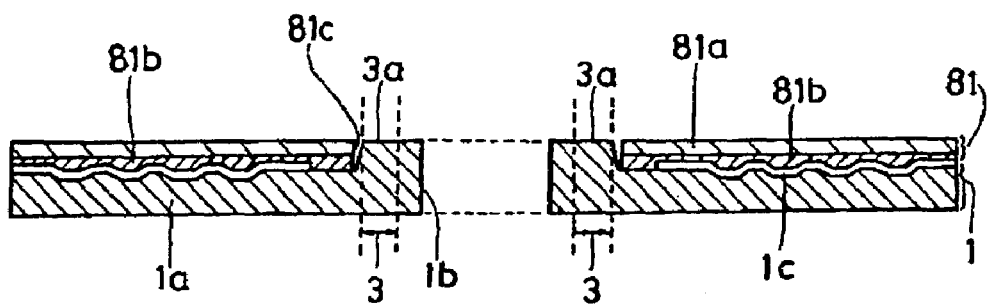
FIG. 10 is a cross sectional view showing an optical disc according to the third embodiment of the invention.
Figure 11:
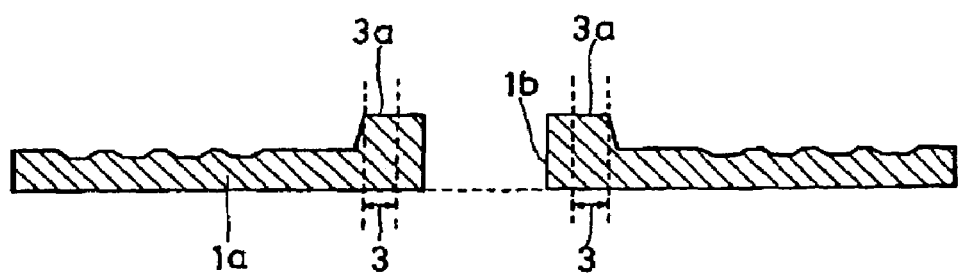
FIG. 11 is a cross sectional view showing a replica substrate according to the third embodiment of the invention.
Figure 12:
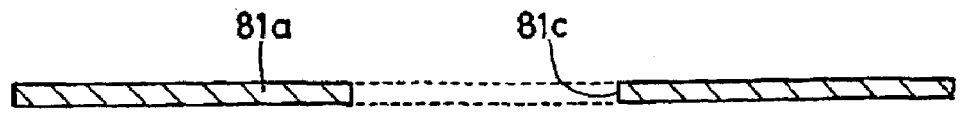
FIG. 12 is a cross sectional view showing a light transmitting sheet according to the third embodiment of the invention.

An optical disc according to the third embodiment of the invention will now be described. FIG. 10 shows the optical disc according to the third embodiment. FIG. 11 shows a replica substrate constructing a disc substrate. FIG. 12 shows a light transmitting sheet.

As shown in FIG. 10, in the optical disc according to the third embodiment, a light transmitting layer 81 comprising a light transmitting sheet 41a and an adhesive layer 81b is formed on the principal plane of the disc substrate 1 on which the information signal portion 1c has been provided.

As shown in FIG. 11, the replica substrate 1a according to the third embodiment is similar to that in the first embodiment.

As shown in FIG. 12, the sheet which is used in the third embodiment is constructed by the light transmitting sheet 81a. In a manner similar to the disc substrate 1, the light transmitting sheet 81a has a structure such that it is punched in a plane ring shape and formed, and a through-hole 81c is formed at a center. Dimensions of the light transmitting sheet 81a are set in a manner such that a diameter (outer diameter) is set to, for example, 119 mm which is equal to or smaller than the outer diameter (for example, 120 mm) of the replica substrate 1a, and a diameter (bore) of the through-hole 81c is set to be larger than the outermost rim diameter of the clamping area 3, specifically speaking, it is set to, for example, 34 mm.

The light transmitting sheet 81a is made of, for example, a thermoplastic resin having light transmitting performance which satisfies optical characteristics by which at least ultraviolet rays can be transmitted. Specifically speaking, the thermoplastic resin is, for example, PC or a methacrylic resin such as polymethyl methacrylate (polymethacrylic methyl) or the like. It is preferable that the light transmitting sheet is made of the same kind of material as that of the replica substrate 1a. In the third embodiment, a thickness of the light transmitting sheet 81a is equal to, for example, 95 μm. The thickness of the light transmitting sheet 81a is determined in consideration of a film thickness of the light transmitting layer 81 which is finally formed.

A manufacturing method of the optical disc according to the third embodiment will now be described. Thus, since the manufacturing method of the disc substrate 1 according to the third embodiment is similar to that in the first embodiment, its explanation is omitted.

Figure 13:
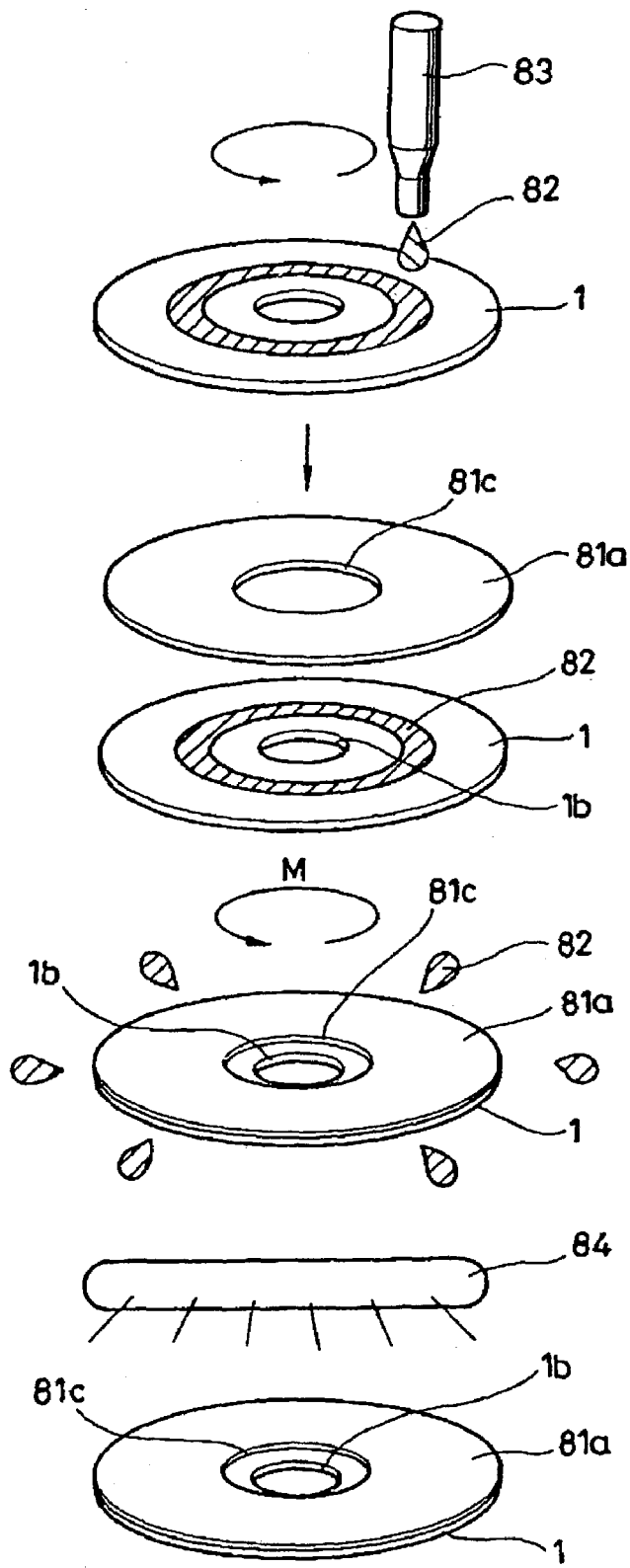
FIG. 13 is a schematic diagram showing a forming method of a light transmitting layer according to the third embodiment of the invention.
Figure 14:
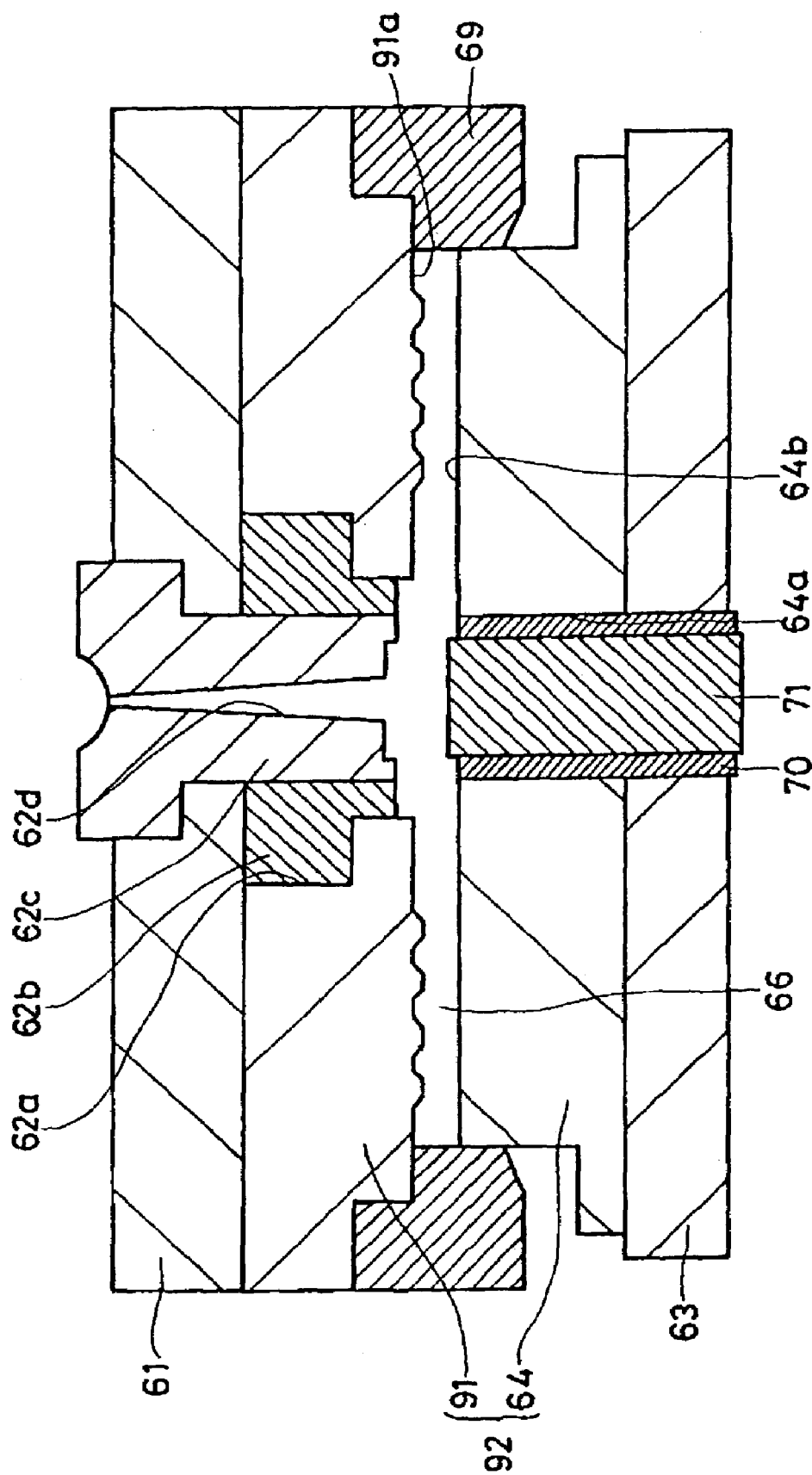
FIG. 14 is a cross sectional view showing an injection molding apparatus for molding a disc-shaped substrate according to the fourth embodiment of the invention.

Subsequently, a method of forming the light transmitting layer 81 onto the disc substrate 1 will be explained. FIG. 13 shows a forming step of the light transmitting layer 81 according to the third embodiment.

First, as shown in A in FIG. 13, an ultraviolet hardening resin 82 is supplied and coated onto the principal plane of the disc substrate 1 on which the information signal portion 1c has been formed. The ultraviolet hardening resin 82 is supplied in, for example, a plane ring shape from a nozzle port of an ultraviolet hardening resin supplying portion 83 toward the inner peripheral side on the principal plane of the disc substrate 1. At this time, the ultraviolet hardening resin supplying portion 83 for emitting the ultraviolet hardening resin 82 and the disc substrate 1 are relatively rotated. In this instance, as an ultraviolet hardening resin 82, for example, a resin whose viscosity is equal to 0.1 Pa·s (100 cps) is used.

Subsequently, as shown in B in FIG. 13, the center hole 1b of the disc substrate 1 and the through-hole 81c at the center of the light transmitting sheet 81a are positioned. After that, the plane ring-shaped light transmitting sheet 81a is put onto the principal plane of the disc substrate 1 to which the ultraviolet hardening resin 82 has been supplied.

Subsequently, as shown in C in FIG. 13, the disc substrate 1 and light transmitting sheet 81a are rotated in an in-plane direction (M direction in C in FIG. 13) around a rotary shaft as a center. Thus, the ultraviolet hardening resin 82 on the disc substrate 1 is fully supplied to a gap between the disc substrate 1 and the light transmitting sheet 81a. The surplus ultraviolet hardening resin 82 is fully taken off. A rotational speed of each of the disc substrate land the light transmitting sheet 81a is equal to, for example, 83.3 sec$^{-1}$ (5000 rpm) and a rotating time is equal to, for example, 20 sec. In the case where the ultraviolet hardening resin 82 is supplied to the surface of the disc substrate 1 on the side opposite to the side where the light transmitting sheet 81a has been adhered and a protective layer (not shown) made of the ultraviolet hardening resin 82 is formed, even in the ultraviolet hardening resin 82 which forms the protective layer, the surplus ultraviolet hardening resin 82 is fully taken off by the rotation in the in-plane direction and uniformly coated, so that the protective layer (not shown) of a uniform thickness is formed.

After the ultraviolet hardening resin 82 was fully supplied to the gap between the disc substrate 1 and the light transmitting sheet 81a and the surplus ultraviolet hardening resin 82 was fully taken off, as shown in D in FIG. 13, the disc substrate 1 is disposed into an irradiating range of an ultraviolet light source 84 constructed so that it can emit ultraviolet rays. At this time, the disc substrate 1 is arranged so that the side where the light transmitting sheet 81a has been put faces the side where the ultraviolet light source 84 has been disposed. After that, the ultraviolet rays are irradiated from the ultraviolet light source 84 onto the ultraviolet hardening resin 82 on the principal plane of the disc substrate 1 via the light transmitting sheet 81a. An integrating intensity at this time is set to, for example, 500 mJ/cm$^2$. By the irradiation of the ultraviolet rays, the ultraviolet hardening resin 82 is hardened between the disc substrate 1 and the light transmitting sheet 81a.

By the above processes, the light transmitting sheet 81a is adhered onto an upper layer of the information signal portion 1c of the surface on the principal plane of the disc substrate 1 via the adhesive layer 81b made of the hardened ultraviolet hardening resin. Thus, as shown in FIG. 10, the desired optical disc in which the information signal portion 1c and the light transmitting layer 81 comprising the adhesive layer 81b and light transmitting sheet 81a have been formed on the principal plane of the replica substrate 1a is manufactured.

As described above, according to the third embodiment, in the disc substrate 1, the disc substrate 1 of what is called a convex shape in which the substrate thickness of the periphery of the center hole 1b is larger than that in the information recording area 4 is manufactured, and in the optical disc using this disc substrate 1, the clamp reference surface 3a is set to the side where the information signal portion 1c around the center hole 1b has been provided. Therefore, an effect similar to that in the first embodiment can be obtained.

Subsequently, an injection molding apparatus for molding a disc-shaped substrate according to the fourth embodiment of the invention will be described. FIG. 13 shows the injection molding apparatus for molding the disc-shaped substrate according to the fourth embodiment.

In the injection molding apparatus for molding the disc-shaped substrate according to the fourth embodiment, unlike the second embodiment, a concave and convex pattern which is transferred onto the recording surface 5 of the replica substrate 1a according to the first embodiment is formed onto a lower surface 91a of a fixed die 91. A die 92 is constructed by the fixed die 91 and movable die 64. Since the concave and convex pattern which is transferred has been formed on the lower surface 91a of the fixed die 91 as mentioned above, the concave and convex pattern can be formed into the portion of the information recording area 54 of the recording surface 55 of the replica substrate 51a without disposing the stamper 67 onto the lower surface 91a of the fixed die 91 as in the second embodiment. Stamper supporting means for fixing the stamper, specifically speaking, suction holes 19, gas emission path 20, tunnel portion 21, gap portion 22, vacuum hose 23, and valve apparatus 24 in the first embodiment and the stamper inner peripheral holder 68, stamper supporting claw portion 68a, and the like in the second embodiment are not provided in the injection molding apparatus for molding the disc-shaped substrate according to the fourth embodiment. The stamper outer peripheral holder 69 is used only for positioning the fixed die 91 and movable die 64. Since the other construction of the injection molding apparatus for molding the disc-shaped substrate according to the fourth embodiment is similar to that in the second embodiment, its explanation is omitted.

Since a forming method of the replica substrate, an optical disc, and a manufacturing method of the optical disc according to the fourth embodiment are similar to those in the first embodiment, their explanation is omitted.

According to the injection molding apparatus for molding the disc-shaped substrate of the fourth embodiment, since the stamper supporting claw portion 68a and the like in the second embodiment are not provided, the stamper pressing groove 51d and the like are not formed. Further, the portion of the replica substrate 1a shown in FIG. 3 where the clamping area 3 is molded is the portion of the fixed die 91 on the outer peripheral side of the lower surface of the sprue bush 62c and the lower surface portion of the sprue bush supporting ring 62b. Therefore, the clamp reference surface 3a in the replica substrate 51a shown in FIG. 3 can be flattened at high precision and the clamp reference surface 3a having high plane surface performance can be formed. Since the clamp reference surface 3a can be set onto the principal plane on which the information signal portion 1c has been provided around the center hole 1b of the disc substrate 1, when the disc is clamped and rotated, a high frictional force can be assured. Therefore, an effect similar to that in the first embodiment can be obtained.

Figure 15:
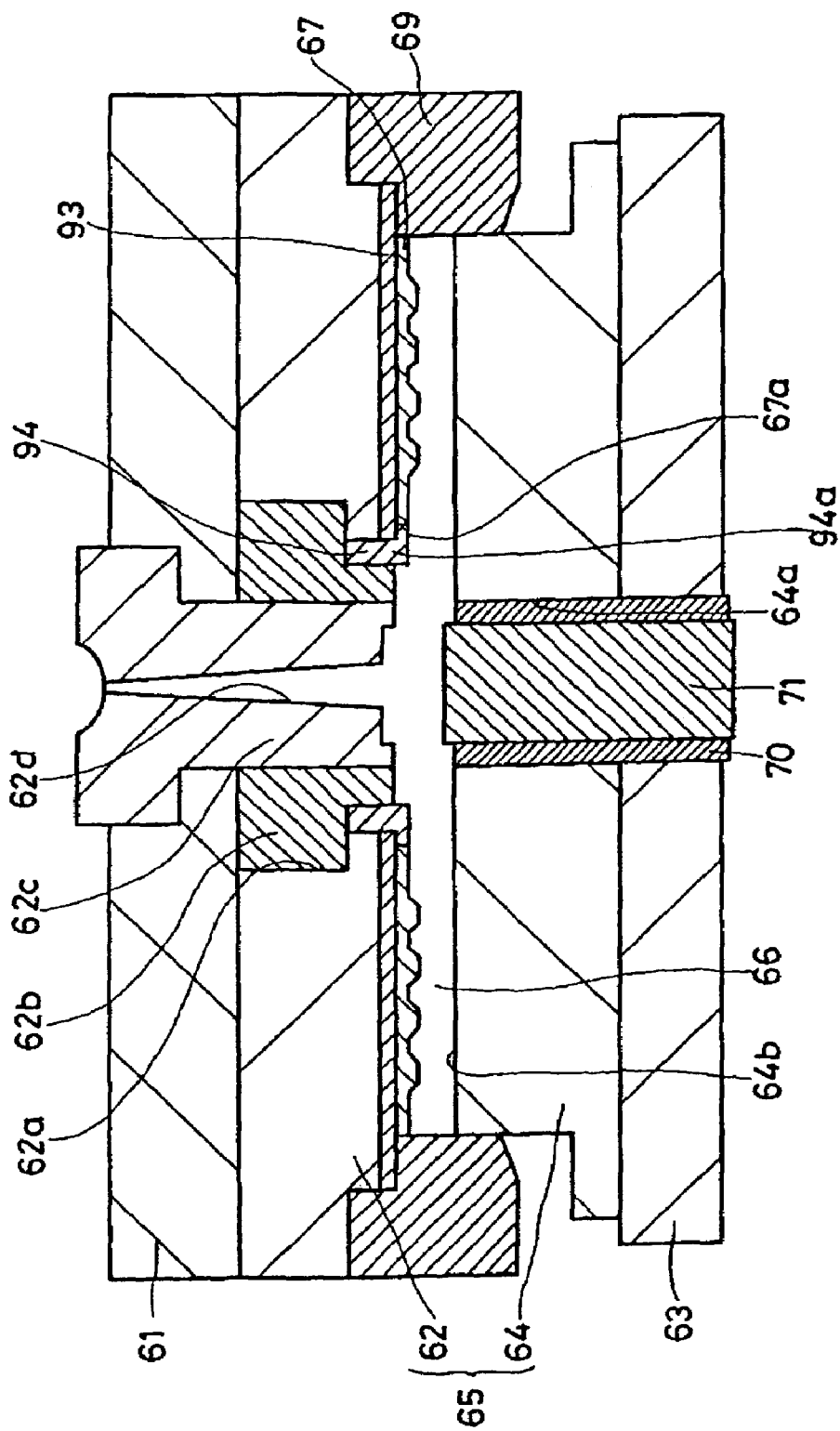
FIG. 15 is across sectional view showing an injection molding apparatus for molding a disc-shaped substrate according to the fifth embodiment of the invention.
Figure 16:
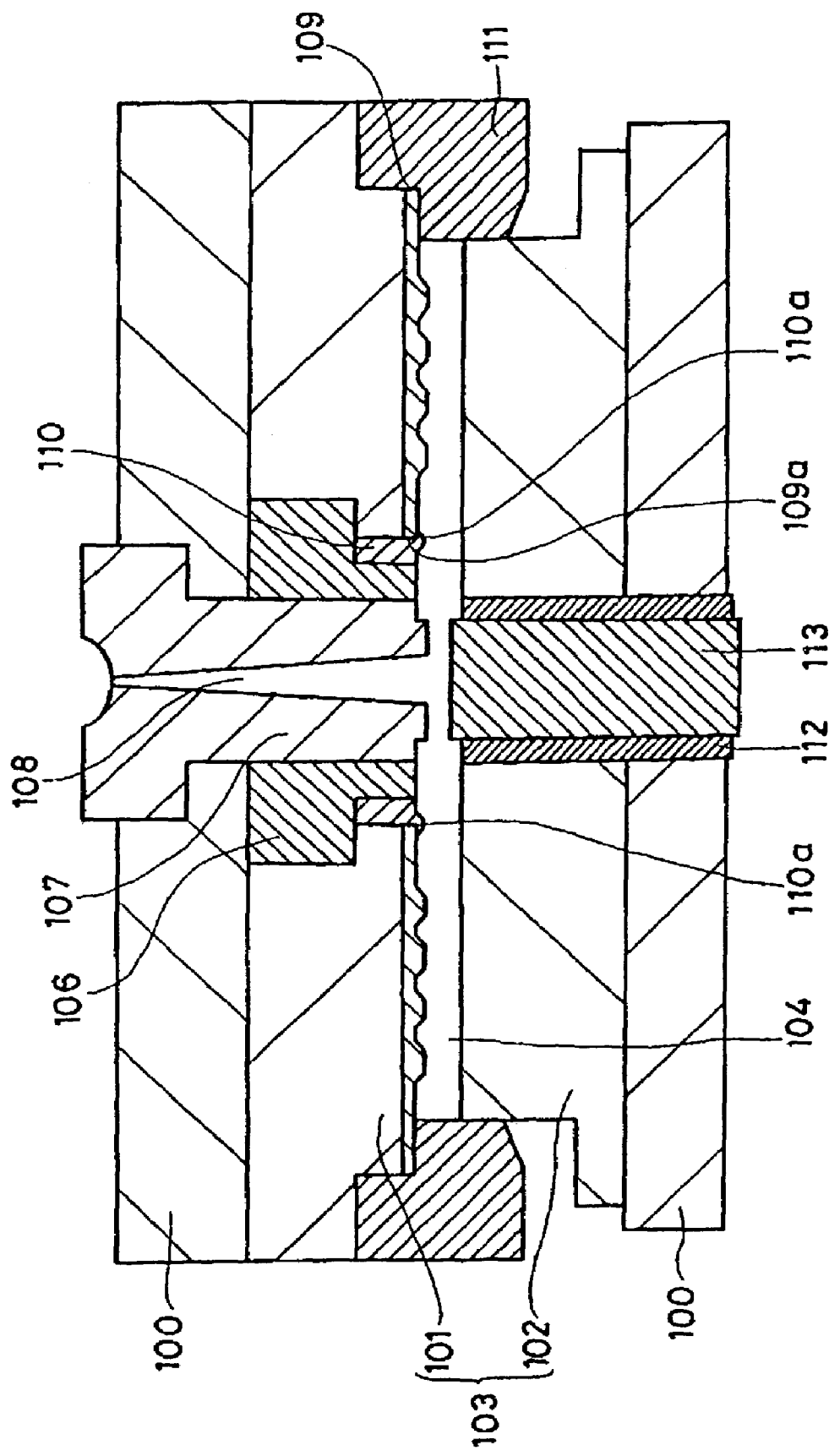
FIG. 16 is a cross sectional view showing a conventional injection molding apparatus for molding a disc-shaped substrate.
Figure 17:
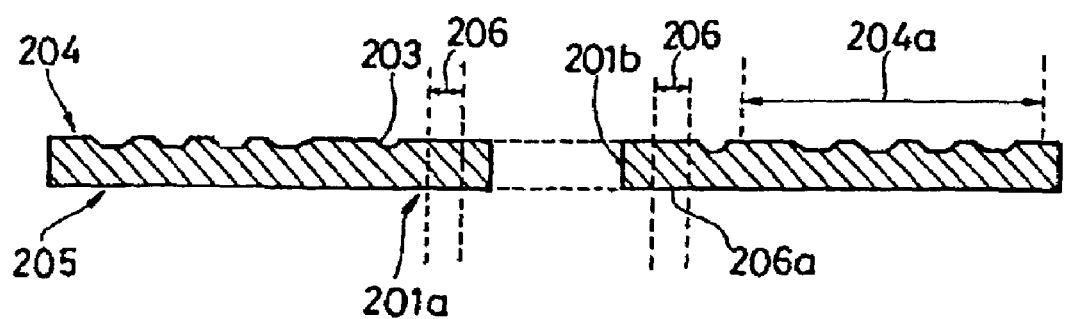
FIG. 17 is a cross sectional view showing a replica substrate which is molded by the conventional injection molding apparatus for molding the disc-shaped substrate.
Figure 18:
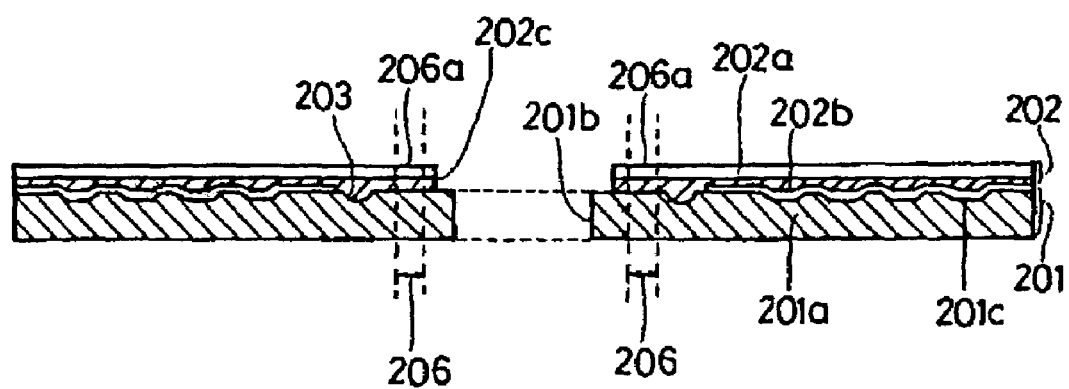
FIG. 18 is a cross sectional view showing an optical disc in which a clamp reference surface has been set to the surface of the light transmitting layer.

An injection molding apparatus for molding a disc-shaped substrate according to the fifth embodiment of the invention will now be described. FIG. 15 shows the injection molding apparatus for molding the disc-shaped substrate according to the fifth embodiment.

As shown in FIG. 15, in the injection molding apparatus for molding the disc-shaped substrate according to the fifth embodiment, unlike the second embodiment, the stamper 67 is fixed to one surface of a stamper stationary platen 93 in which a diameter of a center hole is smaller and an outer rim diameter is larger than those of the stamper 67. The stamper 67 and an inner edge of the stamper stationary platen 93 are fixed by a claw portion 94a for supporting the stamper stationary platen of an inner peripheral side stamper stationary platen holder 94. An outer peripheral edge of the stamper stationary platen 93 is fixed by the stamper outer peripheral holder 69. Thus, the stamper 67 is fixed to one surface of the stamper stationary platen 93 and adhered to the lower surface of the fixed die 62. A portion of the claw portion 94a for supporting the stamper stationary platen where the surface of the molding cavity 66 is constructed so as to become the same surface as the flat surface of the stamper 67. Since the other construction of the injection molding apparatus for molding the disc-shaped substrate according to the fifth embodiment is similar to that in the second embodiment, its description is omitted.

Since a forming method of the replica substrate, a manufacturing method of the optical disc and the optical disc which is manufactured are similar to those in the first embodiment, its description is omitted.

According to the fifth embodiment, the stamper 67 is fixed to one surface of the stamper stationary platen 93 whose inner peripheral diameter is smaller and whose outer peripheral diameter is larger than those of the stamper 67. An inner edge of the stamper stationary platen 93 is fixed by the claw portion 94a for supporting the stamper stationary platen of the inner peripheral side stamper stationary platen holder 94. The portion of the stamper stationary platen supporting claw portion 94a constructing the molding cavity 66 becomes the same plane as the flat surface of the stamper 67. Thus, since the stamper pressing groove and the like in the second embodiment are not formed on the disc substrate, a disc substrate similar to the disc substrate according to the first embodiment can be manufactured. Therefore, an effect similar to that in the first embodiment can be obtained.

Although the embodiments of the invention have specifically been described above, the invention is not limited to the foregoing embodiments but various modifications based on the technical idea of the invention are possible.

For example, the numerical values, the disc substrate materials, and the forming method of the light transmitting layer mentioned in the foregoing embodiments have merely been shown as examples. Numerical values, disc substrate materials, and a forming method of the light transmitting layer which are different from them can be also used as necessary.

For example, although polycarbonate has been used as a material of the disc substrate in the foregoing first to fifth embodiments, a resin having low water absorbance such as cycloolefine polymer (for example, ZEONEX (registered trademark)) or the like except for polycarbonate can be also used.

Since the optical disc to which the invention is applied is an optical disc of the type such that the information signal is recorded and reproduced by irradiating the laser beam onto the disc substrate from the side where the light transmitting layer has been formed, there is no need to consider the transmittance of the laser beam. Therefore, for example, in the foregoing first to fifth embodiments, as a replica substrate, for example, it is possible to use a substrate made of a metal such as Al or the like, a glass substrate, or a substrate made of a resin such as polyolefine, polyimide, polyamide, polyphenylene sulfide, polyethylene terephthalate, or the like.

In the foregoing first embodiment, for example, the suction holes 19 and gas emission path 20 have been arranged between the front edge portion of the sprue bush supporting ring 12b and the lower surface 12e of the fixed die 12. However, the suction holes 19 and gas emission path 20 can be also formed and provided in the portions of the sprue bush supporting ring 12b or the fixed die 12.

As described above, according to the optical recording medium and its manufacturing method of the invention, the flattened clamp reference surface has been set onto the principal plane of the substrate where the information signal portion has been provided. Therefore, even in the case where the optical recording medium which is manufactured by using such a substrate and in which the information signal is recorded and/or reproduced by irradiating the laser beam from the side where the information signal portion has been provided is put to the spindle of the recording and reproducing apparatus and/or the reproducing apparatus, the recording and/or reproduction of the information signal can be executed while the apparatus has the high reliability. Even in the case where the light transmitting layer is provided on the side where the information signal portion has been provided, a possibility that a foreign matter or the like is directly come into contact with the edge portion of the light transmitting layer decreases. Therefore, peel-off of the light transmitting layer can be prevented.

According to the injection molding apparatus according to the invention, the substrate in which the clamp reference surface can be set onto one principal plane of the substrate where the information signal portion has been provided can be manufactured. Thus, the substrate in which the clamp reference surface can be constructed by the flat surface which has been flattened at high precision and has high plane surface performance can be manufactured. Even in the case where the optical recording medium which is manufactured by using such a substrate is clamped and rotated, this optical recording medium can be rotated in a state where high frictional force is assured.

The invention claimed is:

1. An optical recording medium constructed in a manner such that an information signal portion is provided on one principal plane of a substrate and, by irradiating a laser beam to said information signal portion of said substrate from a side where said information signal portion exists, an information signal can be recorded and/or reproduced to/from said information signal portion, wherein a clamp reference surface exists on the principal plane of said substrate where said information signal portion has been provided, at least said clamp reference surface is constructed by a flat surface, and a thickness of said substrate in a clamping area which is specified by said clamp reference surface is larger than that of said substrate in a forming area of at least said information signal portion, wherein a light transmitting layer which can transmit at least said laser beam is provided on the principal plane of said substrate where said information signal portion has been provided, said light transmitting layer is constructed by a light transmitting sheet which can transmit at least said laser beam and an adhesive layer which can transmit at least said laser beam, and said light transmitting sheet is provided via said adhesive layer onto the principal plane of said substrate where said information signal portion has been provided, said adhesive layer is made of a pressure sensitive adhesive agent,
   wherein a groove is formed as a depression into said principal plane of said substrate in an area between said information signal portion and said clamp reference surface, the groove being formed in the area other than the forming area of said information signal portion and an area other than said clamp reference surface,
   wherein said light transmitting layer has a plane ring shape having a second opening in a center portion, and a diameter of said second opening is larger than an outer peripheral diameter of said groove, and
   wherein said light transmitting layer comprises a protective film formed on a surface of said light transmitting sheet opposite said adhesive layer, said protective film comprising an ultraviolet hardening resin and a silicon oil lubricating additive and effecting a high surface lubricating performance, said protective film having been adhered to said light transmitting sheet by a roll coating method prior to said light transmitting layer being adhered to said substrate.

2. An optical recording medium according to claim 1, wherein a total thickness of the thickness of said substrate in an area where said light transmitting layer has been formed and a film thickness of said light transmitting layer is almost equal to the thickness of said substrate in said clamping area.

3. An optical recording medium according to claim 1, wherein said light transmitting sheet is made of a thermoplastic resin which can transmit at least said laser beam.

4. An optical recording medium according to claim 1, wherein said light transmitting sheet is made of a same kind of material as that of said substrate.

5. An optical recording medium according to claim 1, wherein
   said light transmitting sheet is made of a thermoplastic resin which can transmit at least said laser beam.

6. An optical recording medium according to claim 1, wherein
   said light transmitting sheet is made of a same kind of material as that of said substrate.

7. An optical recording medium according to claim 1, wherein said substrate is a disc-shaped substrate having a ring shape in which a first opening is formed in a center portion.

8. An optical recording medium according to claim 7, wherein said clamp reference surface is set in a plane ring shape.

9. An optical recording medium according to claim 8, wherein a diameter of an innermost rim of a clamping area of said clamp reference surface lies within a range from 22 mm or more to 24 mm or less, and a diameter of an outermost rim of a clamping area of said clamp reference surface lies within a range from 32 mm or more to 34 mm or less.

10. An optical recording medium according to claim 1, wherein a film thickness of said light transmitting layer lies within a range from 90 μm or more to 110 μm or less.

11. An optical recording medium according to claim 1, wherein the thickness of said substrate in said clamping area lies within a range from 1.1 mm or more to 1.3 mm or less.

* * * * *